(12) United States Patent
Rekimoto

(10) Patent No.: US 7,523,410 B2
(45) Date of Patent: Apr. 21, 2009

(54) COMPUTER SYSTEMS FOR THE MANAGEMENT AND DISTRIBUTION OF INFORMATION

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/915,989

(22) Filed: Aug. 11, 2004

(65) Prior Publication Data

US 2005/0015724 A1 Jan. 20, 2005

Related U.S. Application Data

(63) Continuation of application No. 09/436,465, filed on Nov. 8, 1999.

(30) Foreign Application Priority Data

| Nov. 12, 1998 | (JP) | ............................... P10-321772 |
| Apr. 15, 1999 | (JP) | ............................... P11-108535 |

(51) Int. Cl.
*G06F 3/00* (2006.01)
(52) U.S. Cl. ..................... 715/778; 715/764; 715/779
(58) Field of Classification Search ................ 715/738, 715/775, 864, 866, 776–779, 961, 963, 719, 715/716, 721, 958, 838, 755, 884, 868
See application file for complete search history.

(56) References Cited

U.S. PATENT DOCUMENTS

| 4,736,308 | A |   | 4/1988  | Heckel |
| 4,980,679 | A | * | 12/1990 | Klaubert ..................... 345/50 |
| 5,592,605 | A |   | 1/1997  | Asuma et al. |
| 5,621,903 | A |   | 4/1997  | Luciw et al. |
| 5,745,116 | A |   | 4/1998  | Pisutha-Arnond |
| 5,806,078 | A | * | 9/1998  | Hug et al. .................... 715/511 |
| 5,860,067 | A |   | 1/1999  | Onda et al. |
| 5,873,108 | A |   | 2/1999  | Goyal et al. |
| 5,936,625 | A |   | 8/1999  | Kahi et al. |
| 5,969,720 | A |   | 10/1999 | Lisle et al. |
| 5,973,682 | A |   | 10/1999 | Saib et al. |
| 5,999,910 | A |   | 12/1999 | Rosenfeld et al. |
| 6,111,572 | A |   | 8/2000  | Blair et al. |
| 6,121,903 | A |   | 9/2000  | Kalkstein |
| 6,141,005 | A |   | 10/2000 | Hetherington et al. |
| 6,236,396 | B1 |  | 5/2001  | Jenson et al. |
| 6,243,071 | B1 |  | 6/2001  | Shwarts et al. |
| 6,266,060 | B1 |  | 7/2001  | Roth |

(Continued)

OTHER PUBLICATIONS

U.S. Appl. No. 09/436,465, filed Nov. 8, 1999, Junichi Rekimoto.

(Continued)

*Primary Examiner*—Weilun Lo
*Assistant Examiner*—Mylinh Tran
(74) *Attorney, Agent, or Firm*—K&L Gates LLP

(57) ABSTRACT

The management of files, folders, and other data is facilitated. When a user inputs a character string (tag), which is desired to be retrieved, to a retrieval character input space and operates a retrieval button on a screen, retrieval is started, and a screen (file) corresponding to the input character string is displayed. This makes it possible for the user to fetch a desired file as required. That is, the user is able to manage and control files without using folders.

12 Claims, 23 Drawing Sheets

U.S. PATENT DOCUMENTS

| | | | |
|---|---|---|---|
| 6,313,852 B1 | 11/2001 | Ishizaki et al. | |
| 6,323,883 B1 | 11/2001 | Minoura et al. | |
| 6,336,053 B1 * | 1/2002 | Beatty | 700/108 |
| 6,353,447 B1 | 3/2002 | Truluck et al. | |
| 6,366,296 B1 * | 4/2002 | Boreczky et al. | 715/719 |
| 6,377,272 B1 * | 4/2002 | Chatterjee et al. | 345/605 |
| 6,647,432 B1 * | 11/2003 | Ahmed et al. | 719/318 |
| 6,816,849 B1 * | 11/2004 | Halt, Jr. | 707/1 |
| 7,000,195 B2 * | 2/2006 | Komuro | 715/805 |
| 2002/0075319 A1 * | 6/2002 | Hochmuth | 345/810 |
| 2002/0178450 A1 * | 11/2002 | Morita et al. | 725/61 |

OTHER PUBLICATIONS

Olsen K. A. et al., "Desktop Visualization" Proceedings of 1994 IEEE Symposium on Visual Language, St. Louis, MO, USA Oct. 4-7, 1994, Los Alamitos, CA, USA, IEEE Comput. Soc., Oct. 4, 1994, pp. 239-244.

Shoens K. et al., "The Rufus System: Information Organization for Semi-Structured Data," Proceedings of the International Conference on Very Large Data Bases, Aug. 24, 1993, pp. 97-107.

Seong-Joon Yoo et al., "Version Management in Structured Document Retrieval Systems" Proceedings. International Conference on Software Engineering and Knowledge Engineering, Jun. 12, 1996, pp. 1-8.

Brown P. J., "The stick-e document: a framework for creating context-aware applications" Electronic Publishing, Wiley, Chichester, GB, vol. 8, No. 2-3, Sep. 24, 1996, pp. 259-272.

Tichy W. F., "RCS—A System for Version Control" Software Practice & Experience, John Wiley & Sons Ltd., Chichester, GB, vol. 15, No. 7, Jul. 1985, pp. 637-654.

Robert Cowart, "Mastering Windows 3.1 Special Edition," Sybex, pp. 809-846, © 1993.

Russell Borland, Running Microsoft Outlook, Microsoft Press, © 1997, pp. 21-82.

Russell Borland, Running Microsoft Outlook, Microsoft Press, pp. 325-354.

* cited by examiner

WEATHERING FUNCTION   1998. 10.20, 10:40 (CURRENT TIME)

FIG. 14A   /1998.9.1/user/rekimoto/doc/genkou.txt

FIG. 14B   /1998.9.10/user/rekimoto/doc/genkou.txt

FIG. 14C   diff /1998.9.1/user/rekimoto/doc/genkou.txt
           /1998.9.10/user/rekimoto/doc/genkou.txt

COMPUTER SYSTEMS FOR THE MANAGEMENT AND DISTRIBUTION OF INFORMATION

PRIORITY CLAIM

This application is a continuation of and claims priority to and the benefit of U.S. patent application Ser. No. 09/436,465, filed Nov. 8, 1999, which is incorporated in its entirety herein.

BACKGROUND OF THE INVENTION

1. Field of the Invention

The present invention relates to an information processing apparatus and method, and to a distribution medium. More particularly, the present invention relates to an information processing apparatus and method suitable for managing files and for managing access to a variety of information, and to a distribution medium therefor.

2. Description of the Related Art

Hitherto, as a technique for managing files created by a computer user, for example, there is a technique for hierarchically storing files using folders. For example, an example of the display of a screen when a user creates a "MEMO" file on a computer and the created "MEMO" file is stored (recorded on a hard disk in a HDD (Hard Disk Drive)) in, for example, a "My Documents" folder is described with reference to FIGS. 27 to 29.

On a PC (Personal Computer), when a user starts up an OS (for example, commonly-known Windows 95 or Windows 98 (trademarks) of Microsoft Corporation), etc., for example, a desktop screen (hereinafter also referred to simply as a "screen") such as that shown in FIG. 27 is displayed. In FIG. 27, when a user operates a pointing device, such as a mouse, and clicks on, for example, a "My Computer" icon 151 on the upper left of the screen, a screen such as that shown in FIG. 28 is displayed.

On the screen of FIG. 28, in the "My Computer" icon 151, an A drive icon 161 for a 3.5-inch FDD (Floppy Disk Drive), a C drive icon 162 for a HDD, a D drive icon 163 for a CD-ROM (Compact Disk-Read Only Memory) drive, a printer icon 164, etc., are stored. When the user operates the pointing device in order to click the C drive icon 162 and further clicks on the "My Documents" folder (not shown) of a layer below, a screen such as that shown in FIG. 29 is displayed.

On the screen of FIG. 29, a "MEMO" file (document file) icon 172 that the user has created and stored, a "1998.10.20" folder icon 171 in which year/month/day is used as a folder name, and for example, a "China" file (document file) icon 173, which is a material about China, are stored in the "My Documents" folder.

However, in the above-mentioned technique, it is required that a user determines which folder a file created by the user should be stored in, and this is burdensome.

Also, for example, as a file management technique in which "Chou Seiri Hou (Ultra Management Technique)" (Chuko Sinsho (small-sized paperback book), written by Yukio Noguchi) is applied, a technique in which the creation year/month/day is used as a folder name like the "1998.10.20" folder icon 171 of FIG. 29, and a created file is stored therein has been proposed. However, it is difficult to accurately perform this technique.

Furthermore, as can be understood from the screen of FIG. 29, since the number of icons which can be placed on the desktop screen is limited due to the limitation of the screen size, when the number of icons is large, management is difficult.

In addition, there is also a problem in that when the above-mentioned application programs which handle files, folders, and other various types of data differ from each other, access and retrieval of these files, folders, and various types of data become very complex. For example, in an operation in which "it is desired to reproduce the state of the desktop at the time a particular piece of electronic mail was received and to access a file of a work being processed at that time" or "it is desired to retrieve an image photographed when a particular text was being written", an operation of several stages extending across a plurality of application programs is required, and this is complex.

SUMMARY OF THE INVENTION

The present invention has been achieved in view of such circumstances. It is an object of the present invention to provide an information processing apparatus and method, and a distribution medium, which are capable of facilitating the management of files, folders, and other data.

To achieve the above-mentioned object, according to one aspect of the present invention, there is provided an information processing apparatus comprising: a storage unit for storing created or changed data in such a manner as to correspond to time information; a day and time setting unit for setting desired day and time; and a control unit for reproducing the state of data corresponding to the set day and time on the basis of the time information.

Here, in the information processing apparatus of the present invention, the storage unit stores a created or changed file in such a manner as to correspond to time information. The day and time setting unit sets day and time according to a past or future screen. The control unit performs control so that a file of the day and time corresponding to the past or future screen is read from the storage unit, is reproduced, and is displayed on the screen.

Also, in the information processing apparatus of the present invention, time information transmission and receiving unit which is capable of transmitting and receiving the time information is provided, and the day and time setting unit sets the day and time on the basis of the received time information.

According to another aspect of the present invention, there is provided a information processing method comprising: a storing step for storing created or changed data in such a manner as to correspond to time information; a day and time setting step for setting desired day and time; and a control step for reproducing the state of data corresponding to the set day and time on the basis of the time information.

Here, in the information processing method of the present invention, the storing step stores a created or changed file in such a manner as to correspond to time information, the day and time setting step sets desired day and time according to a past or future screen, and the control step performs control so that a file of the day and time corresponding to the past or future screen is reproduced and is displayed on the screen.

Also, in the information processing method of the present invention, a time information transmission and receiving step which is capable of transmitting and receiving the time information is provided, and the day and time setting step sets the day and time on the basis of the received time information.

According to another aspect of the present invention, there is provided a computer-readable distribution medium for providing a program for executing a process, the process comprising: a storing step for storing created or changed data in such a manner as to correspond to time information; a day and time setting step for setting desired day and time; and a control step for reproducing the state of data corresponding to the set day and time on the basis of the time information.

Here, in the distribution medium of the present invention, the storing step stores a created or changed file in such a manner as to correspond to time information, the day and time setting step sets day and time according to a past or future screen, and the control step performs control so that a file of the day and time corresponding the past or future screen is reproduced and is displayed on the screen.

Also, in the distribution medium of the present invention, a time information transmission and receiving step which is capable of transmitting and receiving the time information is provided, and the day and time setting step sets the day and time on the basis of the received time information.

The above and further objects, aspects and novel features of the invention will become more apparent from the following detailed description when read in conjunction with the accompanying drawings.

BRIEF DESCRIPTION OF THE FIGURES

FIGS. 14A, 14B, and 14C are views illustrating a case in which the first embodiment of the present invention is applied to an OS (for example, UNIX).

DETAILED DESCRIPTION OF THE INVENTION

The preferred embodiments of the present invention will now be described with reference to the drawings.

Figure 1:
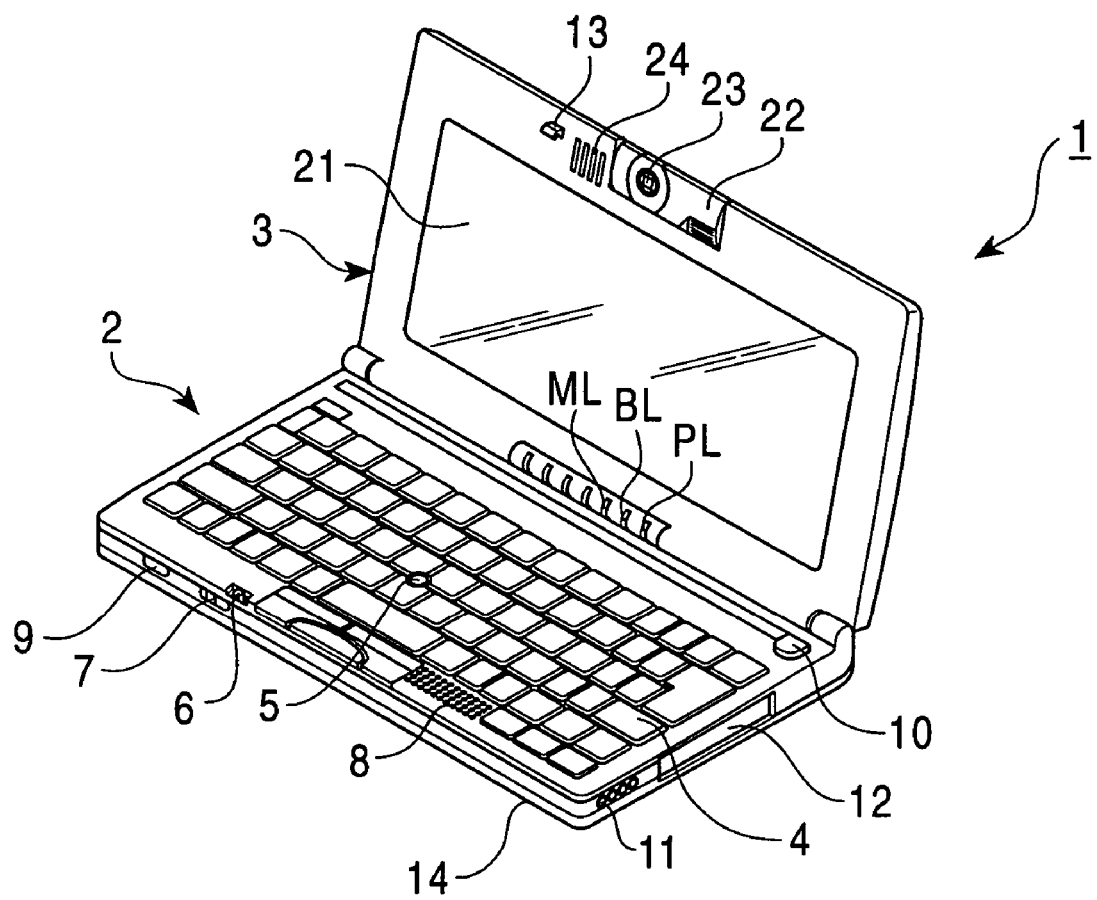
FIG. 1 is a perspective view of the exterior of a personal computer showing a state in which a display section is opened with respect to a main unit in an example of the construction of a portable personal computer of the present invention.
Figure 2:
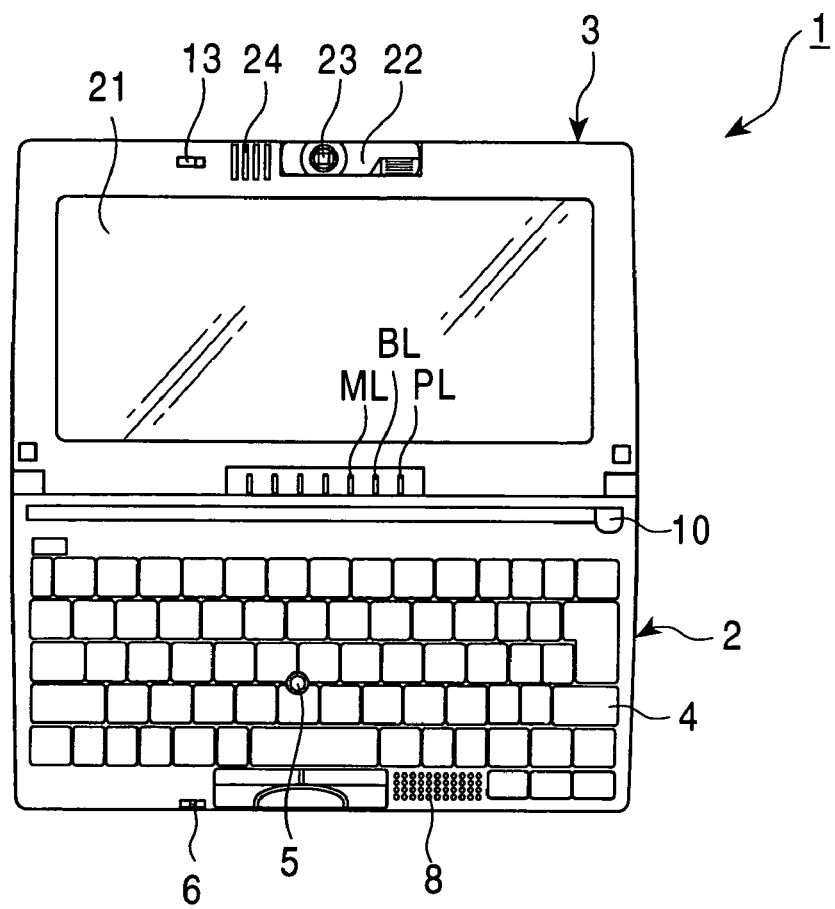
FIG. 2 is a plan view of the personal computer of FIG. 1.
Figure 3:
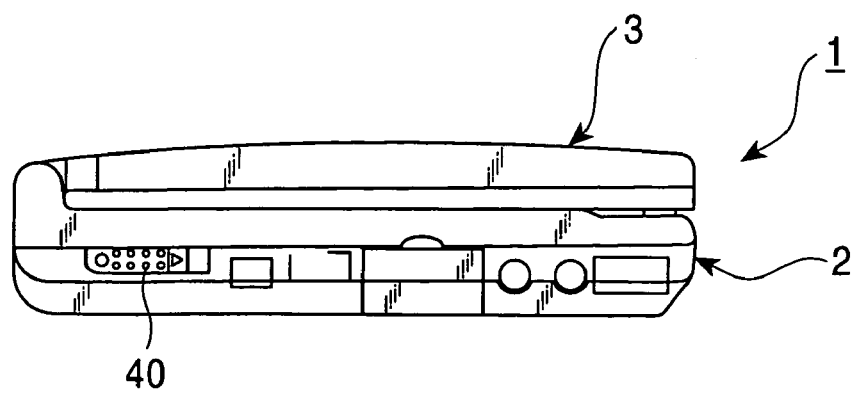
FIG. 3 is a left side view showing a state in which the display section of FIG. 1 is closed with respect to the main unit.
Figure 4:
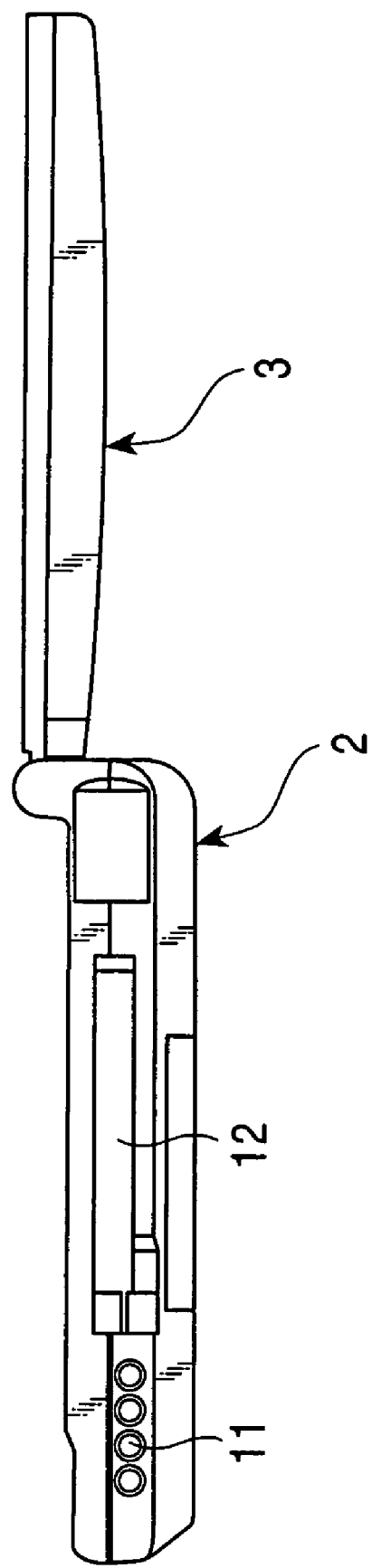
FIG. 4 is a right side view showing a state in which the display section of FIG. 1 is opened 180 degrees with respect to the main unit.
Figure 5:
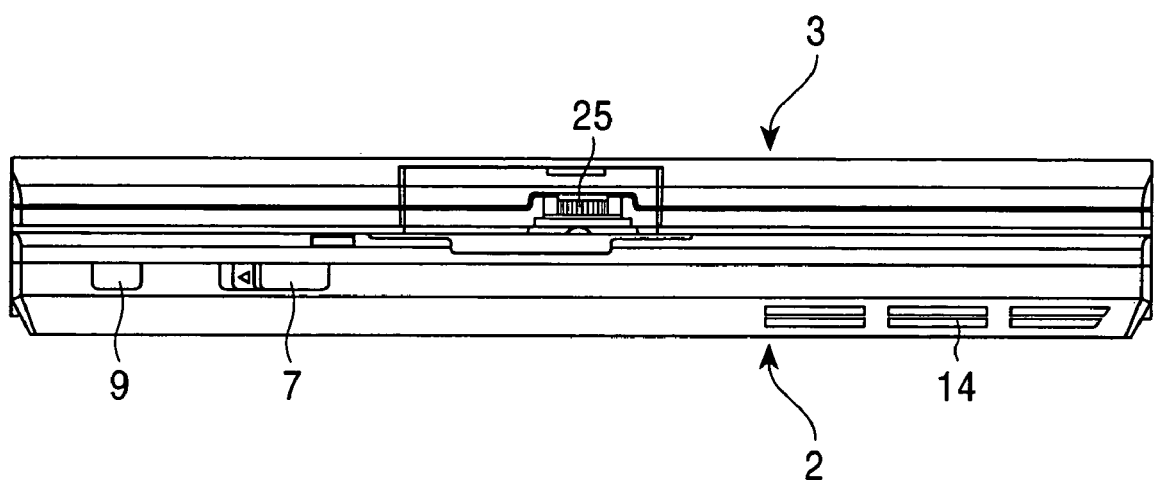
FIG. 5 is a front view of the personal computer of FIG. 3.
Figure 6:
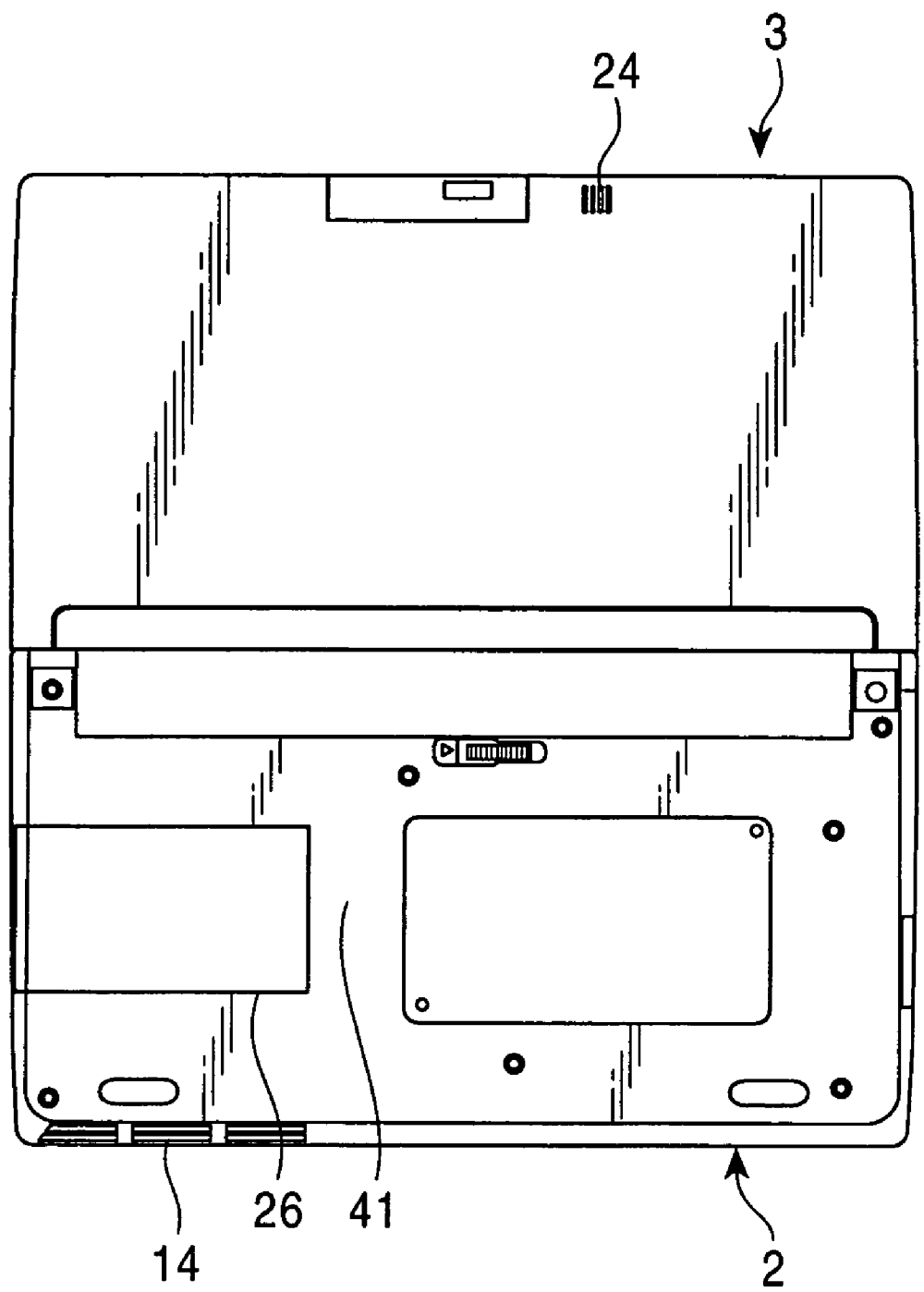
FIG. 6 is a bottom view of the personal computer of FIG. 4.

FIGS. 1 to 6 show an example of the construction of a portable personal computer as an example to which an information processing apparatus and method, and a distribution medium of the present invention, are applied. The personal computer 1 is a mininotebook-type personal computer, and basically comprises a main unit 2 and a display section 3 which can be freely opened and closed with respect to the main unit 2. FIG. 1 is a perspective view of the exterior of a personal computer showing a state in which the display section 3 is opened with respect to the main unit 2. FIG. 2 is a plan view of the personal computer of FIG. 1. FIG. 3 is a left side view showing a state in which the display section 3 is closed with respect to the main unit 2. FIG. 4 is a right side view showing a state in which the display section 3 is opened 180 degrees with respect to the main unit 2. FIG. 5 is a front view of the personal computer of FIG. 3. FIG. 6 is a bottom view of the personal computer of FIG. 4.

A keyboard 4 which is operated when various types of characters and symbols are input, and a track point (trademark) 5 as a pointing device, which is operated when a mouse cursor is moved, are provided on the top surface of the main unit 2. Also, a speaker 8 which outputs sound and a shutter button 10 which is operated when taking photographs with a CCD video camera 23 provided in the display section 3 are further provided on the top surface of the main unit 2.

A hook 13 is provided in the upper end portion of the display section 3. As shown in FIG. 3, a hole 6 into which the hook 13 is fitted in a state in which the display section 3 is closed with respect to the main unit 2 is provided in the main unit 2 at a position facing the hook 13. A slide lever 7 is provided in such a manner as to be movable in parallel on the front side of the main unit 2. The slide lever 7 is engaged with the hook 13 fitted to the hole 6 in order to make it possible to lock and to release the lock. By releasing the lock, the display section 3 can be rotationally moved with respect to the main unit 2. A microphone 24 is mounted adjacent to the hook 13. This microphone 24 is capable of picking up sound from the rear side, as is also shown in FIG. 6.

A programmable power key (PPK) 9 is further provided on the front side of the main unit 2. As shown in FIG. 4, an exhaust hole 11 is provided on the right side of the main unit 2. As shown in FIG. 5, an intake hole 14 is provided in the lower portion of the front of the main unit 2. Furthermore, on the side to the right of the exhaust hole 11, a slot 12 to which a PCMCIA (Personal Computer Memory Card International Association) card (PC card) is inserted is provided.

An LCD (Liquid Crystal Display) 21 for displaying an image is provided on the front of the display section 3, and an image pickup section 22 is provided in the upper end portion thereof in such a manner as to be rotationally movable with respect to the display section 3. That is, this image pickup section 22 is capable of rotationally moving to any position in a range of 180 degrees between the direction of the LCD 21 and the opposite direction (backward). The CCD video camera 23 is mounted to the image pickup section 22.

A power-supply lamp PL, a battery lamp BL, a message lamp ML, and other lamps formed of LEDs are provided on the lower side of the display section 3 adjacent to the main unit. Reference numeral 40 shown in FIG. 3 denotes a power switch provided on the left side of the main unit 2. Reference numeral 25 shown in FIG. 5 denotes a focus adjustment ring for adjusting the focus of the CCD video camera 23. Furthermore, reference numeral 26 shown in FIG. 6 denotes a cover for covering the opening portion for mounting an expansion memory inside the main unit 2, and reference numeral 41 denotes a small hole for inserting a pin for releasing the lock hook of the cover 26.

Figure 7:
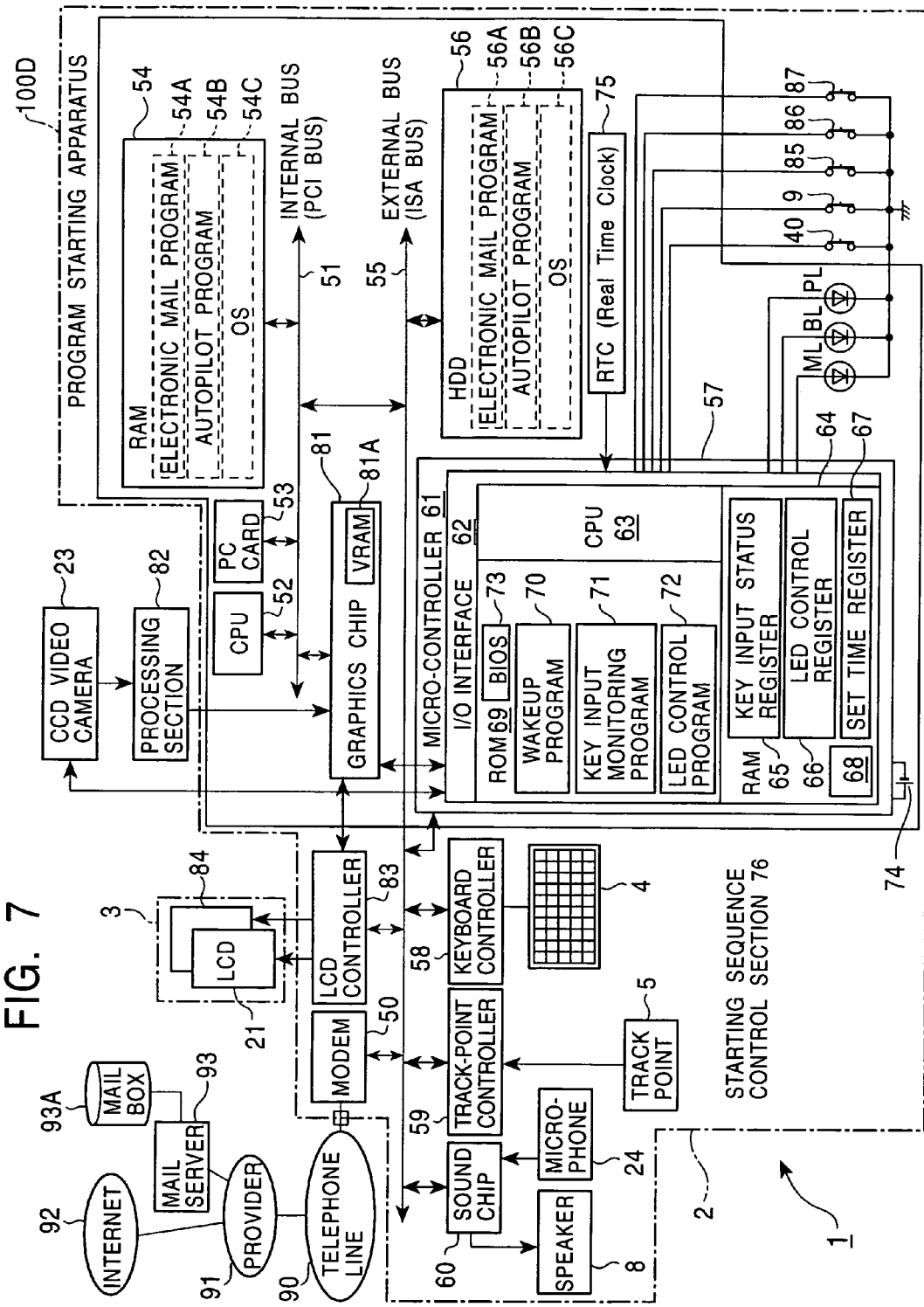
FIG. 7 is a block diagram showing an example of the construction of electrical circuits of FIG. 1.

FIG. 7 shows the electrical construction of the inside of the personal computer 1. A CPU (Central Processing Unit) 52, a PC card 53 which is inserted as required, a RAM (Random Access Memory) 54, and a graphics chip 81 are connected to an internal (PCI (Peripheral Component Interconnect)) bus 51. This internal bus 51 is connected to an external (ISA (Industrial Standard Architecture)) bus 55. A hard disk drive (HDD) 56, an I/O (input/output) controller 57, a keyboard controller 58, a track-point controller 59, a sound chip 60, an LCD controller 83, a modem 50, etc., are connected to the external bus 55.

The CPU 52 is a controller for centrally controlling each function, and the PC card 53 is loaded as required when an optional function is added.

When the starting is completed, for example, an electronic mail program (application program) 54A, an autopilot program (application program) 54B, and an OS (operating system) 54C are transferred to the RAM 54 from the HDD 56 and are stored therein.

The electronic mail program 54A is a program for exchanging communication text from a communication line, such as a telephone line, via a network. The electronic mail program 54A has a received-mail obtaining function as a specific function. This received-mail obtaining function confirms whether or not you (the user) have received mail in a mail box 93A of a mail server 93, and performs a process for obtaining it when you do have mail.

The autopilot program 54B is a program for sequentially starting a plurality of processes (or programs) which have been set in advance in a preset sequence and for processing them.

The OS 54C controls the basic operations of a computer, typified by the commonly-known Windows 95 and Windows 98 (trademarks) of Microsoft Corporation, and the commonly-known Mac OS of Apple Computer.

On the other hand, various application programs, such as an electronic mail program 56A and an autopilot program 56B, and an OS 56C are stored on the hard disk drive (HDD) 56 on the external bus 55 side. The OS 56C, the autopilot program 56B, and the electronic mail program 56A on the hard disk drive 56 are sequentially transferred to the RAM 54 and are stored therein during the start-up (boot-up) process.

The I/O controller 57 has a micro-controller 61, and this micro-controller 61 is provided with an I/O interface 62. The micro-controller 61 is constructed in such a way that the I/O interface 62, the CPU 63, the RAM 64, and a ROM 69 are interconnected to each other. This RAM 64 has a key input status register 65, an LED (light-emitting diode) control register 66, a set time register 67, and a register 68. The set time register 67 is used when the operation of a starting sequence control section 76 is started when a time (starting condition) which is set by the user in advance is reached. The register 68 stores the correspondence between a combination (starting condition) of preset operation keys and an application program to be started. When the stored combination of operation keys is input by the user, the stored application program (for example, an electronic mail program) is started.

The key input status register 65 is formed such that when the programmable power key (PPK) 9 for one-touch operation is pressed, an operation key flag is stored therein. The LED control register 66 is used to control the switching-on of the message lamp ML for displaying the started state of the application program (electronic mail program) stored in the register 68. The set time register 67 is capable of setting a predetermined time as desired.

A battery 74 for backup is connected to the micro-controller 61, so that the values of the registers 65, 66, and 67 are maintained even in a state in which the power of the main unit 2 is turned off.

A wakeup program 70, a key input monitoring program 71, and an LED control program 72 are stored in advance in the ROM 69 inside the micro-controller 61. This ROM 69 is formed of, for example, an EEPROM (electrically erasable and programmable read only memory). This EEPROM is also called a flash memory. Furthermore, an RTC (Real-Time Clock) 75 for continuously counting the current time is connected to the micro-controller 61.

The wakeup program 70 in the ROM 69 is a program in which it is checked whether or not the time which is preset in the set time register 67 is reached on the basis of the current time data supplied from the RTC 75, and when the set time is reached, a predetermined process (or program) is started. The key input monitoring program 71 is a program for continuously monitoring whether or not the PPK 9 has been pressed by the user. The LED control program 72 is a program for controlling the switching-on of the message lamp ML.

A BIOS (Basic Input/Output System) 73 is further written into the ROM 69. This BIOS refers to a basic input/output system and is a software program for controlling exchange of data among the OS, an application program, and peripheral units (display, keyboard, hard disk drive, etc.).

The keyboard controller 58 connected to the external bus 55 controls an input from the keyboard 4. The track-point controller 59 controls an input from the track point 5.

The sound chip 60 accepts an input from the microphone 24 or supplies an audio signal to the built-in speaker 8.

The modem 50 is capable of making connection to a communication network 92 such as the Internet, a mail server 93, etc., via a public telephone line 90 and an Internet service provider 91.

Image data captured by the CCD video camera 23 is processed by a processing section 82, after which the image data is input to the graphics chip 81 connected to the internal bus 51. The graphics chip 81 stores in a built-in VRAM 82A the video data input from the CCD video camera 23 via the processing section 82, reads the input video data as required, and outputs it to an LCD controller 83. The LCD controller 83 outputs the image data supplied from the graphics chip 81 to the LCD 21 whereby the image data is displayed thereon. A backlight 84 illuminates the LCD 21 from the rear.

The power switch 40 is operated when the power supply is turned on or off. A half-press switch 85 is turned on when the shutter button 10 is depressed halfway, and a full-press switch 86 is turned on when the shutter button 10 is fully depressed. An inversion switch 87 is turned on when the image pickup section 22 is rotated 180 degrees (when the CCD video camera 23 is rotated in a direction in which the opposite side of the LCD 21 is photographed).

Next, a description is given of the first embodiment of the present invention. The personal computer of the first embodiment of the present invention is an information processing apparatus for managing created files. The personal computer comprises storage means (for example, the HDD 56 of FIG. 7) for storing a created file in such a manner as to correspond to day and time; switching means (for example, movement buttons 124a and 124b of FIG. 8) for switching the screen to a past or future screen; and display control means (for example, the LCD controller 83) for controlling the display so that a file of the day and time corresponding to the past or future screen switched by the switching means is displayed.

In addition, the personal computer of the first embodiment of the present invention further comprises input means (for example, the keyboard 4 of FIG. 7) for inputting a character string to be retrieved; and retrieval means (for example, retrieval buttons 126a and 126b of FIG. 8) for retrieving a file corresponding to the character string which is input by the input means with respect to the past or the future.

A GUI (Graphical User Interface) screen in the personal computer of the first embodiment of the present invention is described below with reference to FIG. 8.

Figure 8:
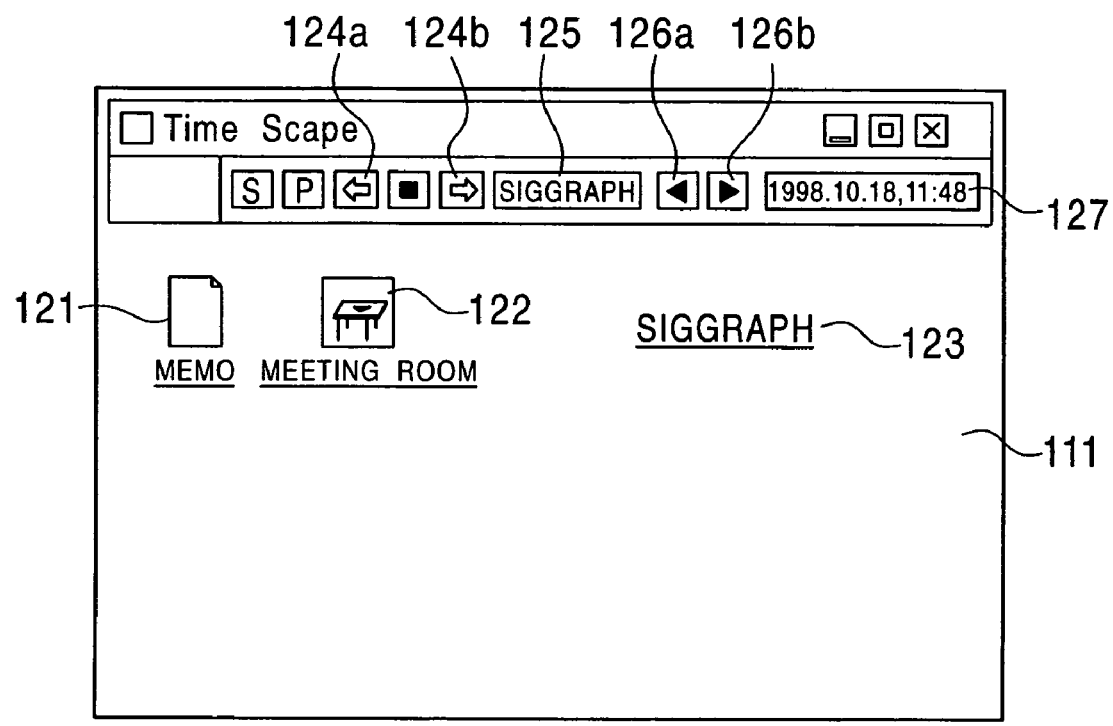
FIG. 8 is a view showing an example of the display of a GUI screen according to a first embodiment of the present invention.

In the personal computer of the first embodiment of the present invention, as shown in FIG. 8, an icon 121 of a document file (for example, a "MEMO" file) created by the user can be freely placed on a desktop screen 111 according to the operation of a pointing device (for example, track point 5) by the user. Also, an icon 122 of an image file (for example, a "Meeting Room" file) and a keyword character string (tag) 123 can also be freely placed. In this embodiment, a folder for managing files is not used in principle.

The desktop screen 111 corresponds to a predetermined time (day and time) on the time axis. In the personal computer of the first embodiment of the present invention, when a predetermined time on the time axis is specified by the user, the image corresponding to the predetermined time is displayed on the desktop screen 111. Also, in the personal computer of the first embodiment, for example, when the user operates the movement button 124a using the track point 5, the desktop screen 111 is returned to a past screen. When, in contrast, the user operates the movement button 124b using the track point 5, the desktop screen 111 is moved to a future screen.

In the personal computer of the first embodiment, when a character string (tag) which is desired to be retrieved is input to a retrieval character input space 125 by the user operating the keyboard 4, a process for retrieving the character string is performed. Also, when the user operates the retrieval button 126a using the track point 5 in order to instruct that a character string (tag) be retrieved by going back in time, the personal computer of this embodiment performs retrieval with respect to past screens. Furthermore, when the user operates the retrieval button 126b using the track point 5 in order to instruct that a character string (tag) be retrieved by moving to a future time, the personal computer of this embodiment performs retrieval with respect to future screens.

A day-and-time display section 127 is provided in the desktop screen 111, and day and time (in the case of the example of the display of FIG. 8, 11:48 Oct. 18, 1998) corresponding to the screen 111 being displayed at that time is displayed.

On the desktop screen 111, an icon (an icon of a file remaining at that day and time) of a file which is created at the corresponding day and time and which is recorded on the HDD 56 is displayed. Here, when the user operates the track point 5 so as to drag-and-drop, for example, a document file icon 121, an image file icon 122, or a tag icon 123 to a "Trash" icon (not shown) on the screen, the corresponding file is deleted and its icon is erased from the screen. However, these files are recorded once on the HDD 56 when the icon is created, and this recorded data itself is maintained (not erased) as it is on the HDD 56. Therefore, when the user operates the movement button 124a using the track point 5 and, in response, the screen is returned to the screen 111 of the day and time (past) immediately before the time when the file was deleted, the document file icon 121, the image file icon 122, or the tag icon 123 is displayed again. When those icons are moved to, for example, the screen of the present day and time by the user, the file can be restored. Therefore, it is possible for the user to delete the icon relatively unconsciously, and the number of icons to be displayed on the screen can be limited to an appropriate number so as to make them easy to see.

Figure 9:
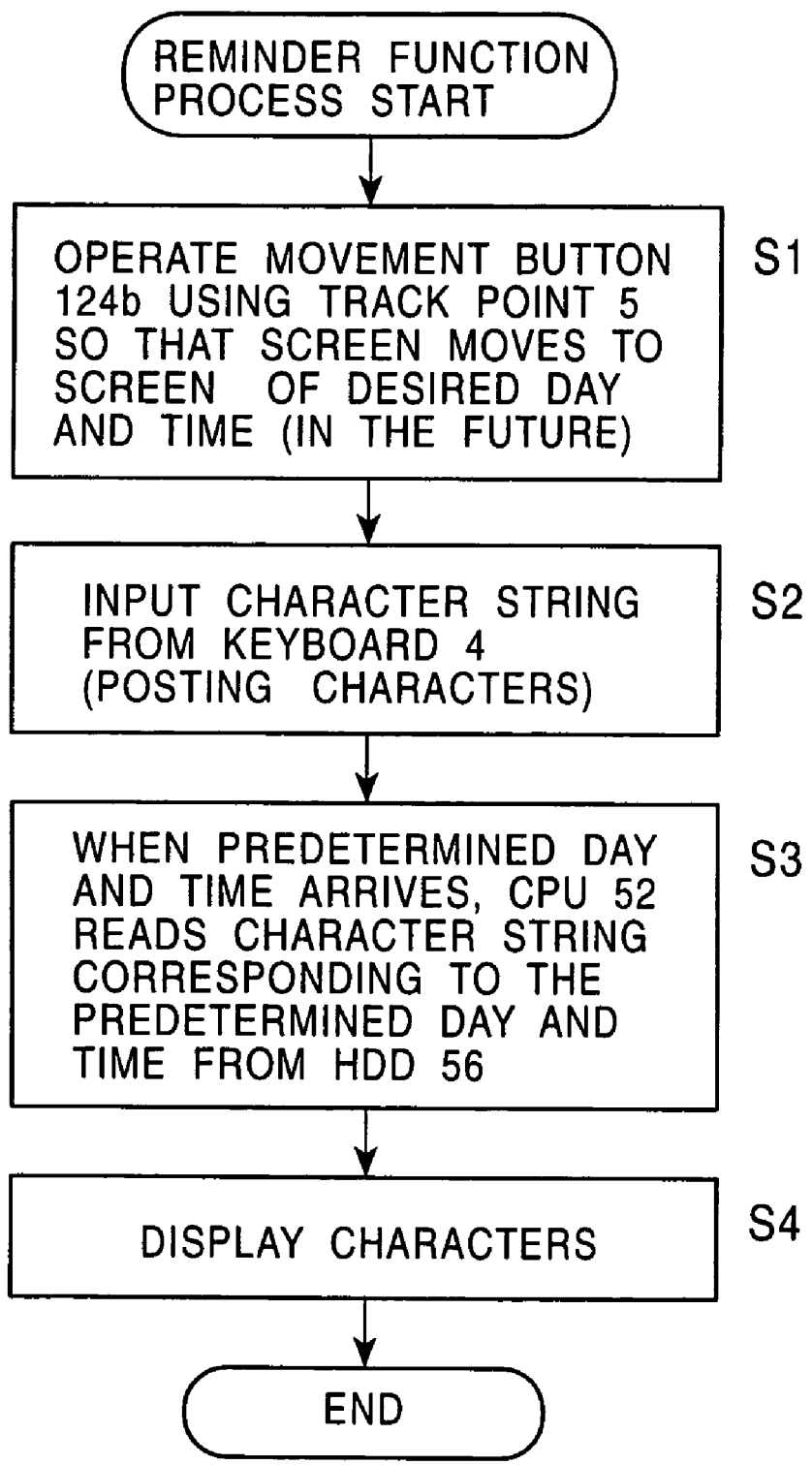
FIG. 9 is a flowchart illustrating a processing operation when the time axis of a screen 111 of FIG. 8 is moved to the future and is used as a reminder.

Next, referring to the flowchart in FIG. 9, a processing operation in a case in which the time axis of the desktop screen 111 is moved to the future and is used as a reminder is described.

In FIG. 9, when the keyboard 4 or the track point 5 is operated by the user in order to instruct that a reminder function is to be activated, the instruction is notified to the CPU 52 of the personal computer of this embodiment.

Here, initially, in step S1, when the user operates the movement button 124b using the track point 5, a signal indicating the day and time of the movement destination is supplied to the CPU 52 via the track-point controller 59. The CPU 52 reads the file which is made effective at the day and time corresponding to the supplied signal from the file management information stored in the HDD 56, causes the graphics chip 81 to generate a corresponding icon, and causes the LCD 21 to display it via the LCD controller 83. As a result, the desktop screen 111 of the personal computer is moved to the screen 111 of the desired day and time (in the future).

On the desktop screen 111 moved as described above, when a character string which is desired to be displayed is input from the keyboard 4 by the user in step S2, the input character string is recorded on the HDD 56 via the keyboard controller 58 and the external bus 55.

The CPU 52 at this time performs a clocking operation by a built-in timer in step S3. When the predetermined day and time arrives, a character string to be displayed on the screen corresponding to the day and time is read from the file management information of the HDD 56, and the read character string is supplied to the LCD controller 83 via the external bus 55.

As a result, the LCD controller 83 displays the supplied character string on the screen 111 of the LCD 21 in step S4.

Figure 10:
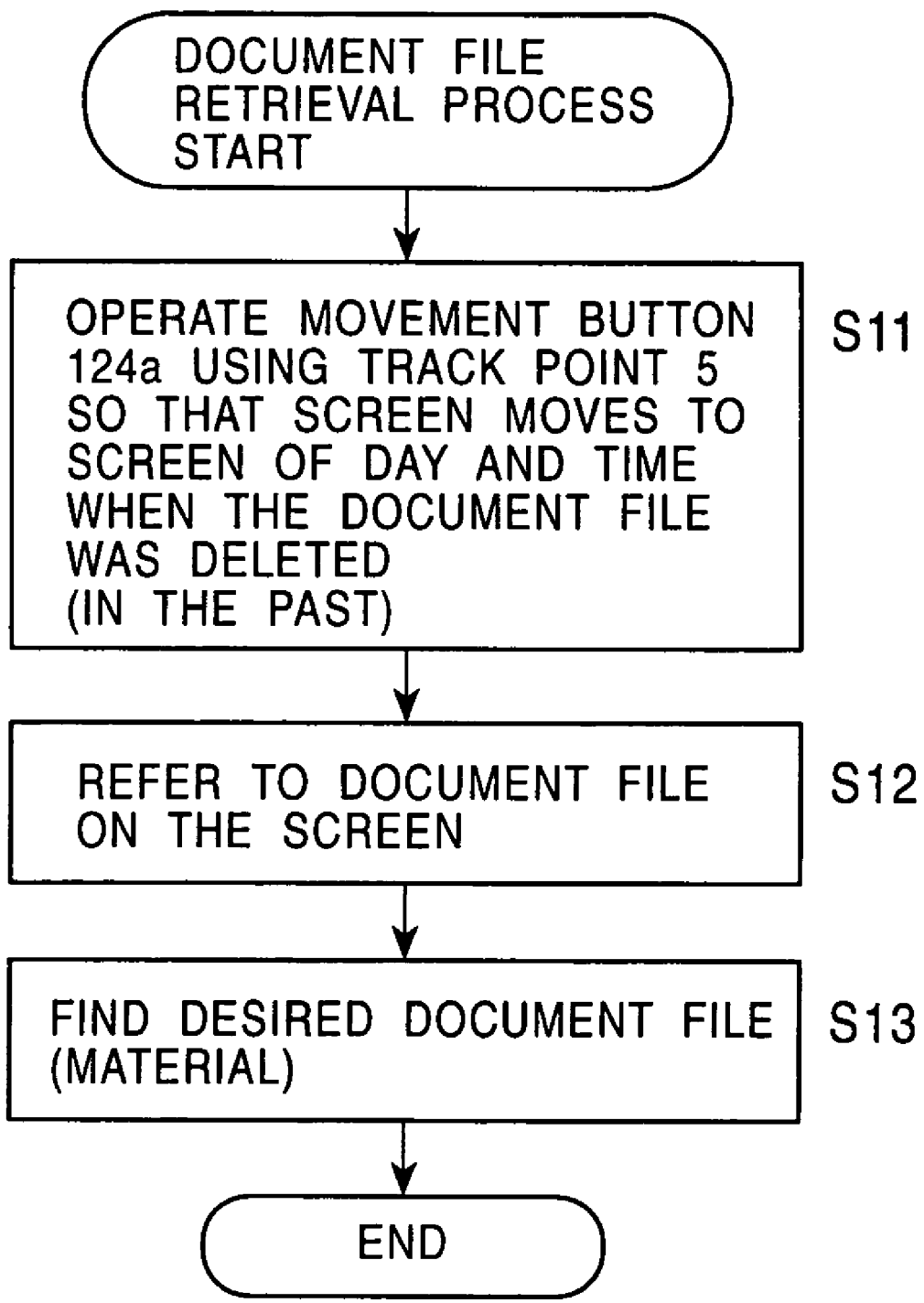
FIG. 10 is a flowchart illustrating a processing operation when the time axis of the screen 111 is moved to the past, and a desired document file is retrieved.

Next, referring to the flowchart in FIG. 10, a description is given of a processing operation when the time axis of the screen 111 is moved to the past, and a desired document file is retrieved in the first embodiment. Here, a description is given by using as an example a case in which related materials, when the user creates an original document, are retrieved.

Initially, when the document is created by the user, the CPU 52 creates a document file corresponding to the document. The created document file is recorded on the HDD 56. Next, when a transmission command for the created document file is input from the keyboard 4 by the user, the command signal is input to the CPU 52 via the keyboard controller 58, the external bus 55, and the internal bus 51. When the transmission command of the document file is received, the CPU 52 reads the document file recorded on the HDD 56 from the HDD 56, and supplies the document file to the modem 50 via the external bus 55. The modem 50 transmits the supplied document file to a transmission destination specified by the user based on the command of the CPU 52 via the telephone line 90, the provider 91, and the Internet 92.

Thereafter, it is assumed that the icon of the transmitted document file is erased (dragged-and-dropped to the "Trash" icon (not shown)) from the screen.

In this state, for example, when the user desires to retrieve the material related to the deleted document file, a command so indicating is input to the CPU 52 by the user.

More specifically, in step S11 in FIG. 10, when the user operates the movement button 124*a* using the track point 5, an operation signal thereof is supplied to the CPU 52 via the track-point controller 59, the external bus 55, and the internal bus 51. The CPU 52 reads as to what the file of the day and time corresponding to the supplied signal is from the file management information of the HDD 56 and causes the LCD 21 to display it via the LCD controller 83.

As a result, the user can be informed of the file which was effective at the day and time (past) when the document file (document) was deleted. Also, the user can refer to each document file displayed on the screen 111 in step S12. Furthermore, the user can find a desired piece of material (document file) related to the deleted document (document file) from among the document files displayed on the screen 111 in step S13.

Figure 11:
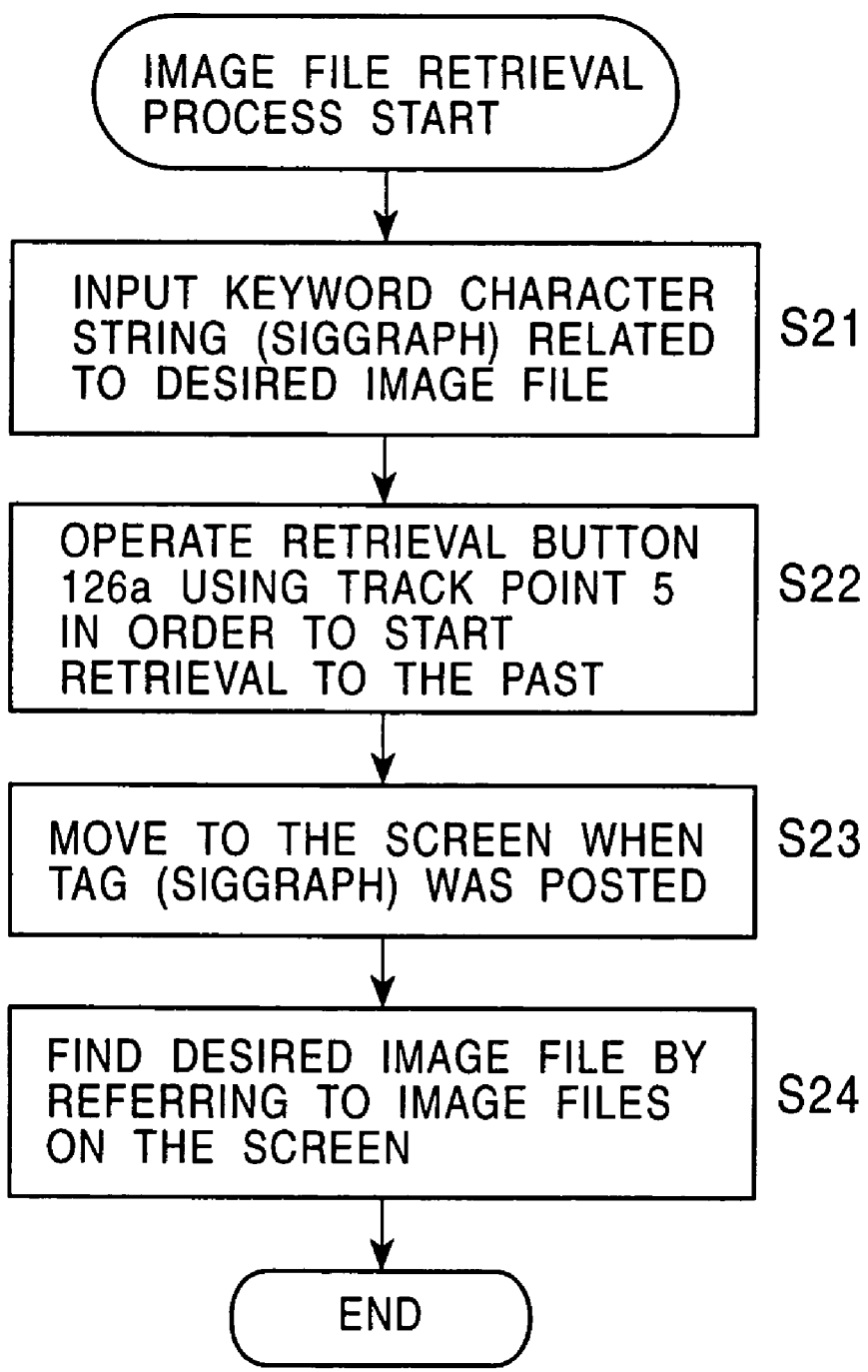
FIG. 11 is a flowchart illustrating a processing operation when a desired image file is retrieved by using a tag posted on the screen 111.

Next, referring to the flowchart in FIG. 11, a description is given of a processing operation in a case in which a desired image file is retrieved by using a tag posted on the screen 111.

When a desired image file is retrieved, a command for the retrieval is input to the CPU 52. Here, when a keyword character string (for example, SIGGRAPH represents a subcommittee for CG of ACM (Association for Computing Machinery)) related to an image file is input to the retrieval character input space 125 by operating the keyboard 4 by the user in step S21, the CPU 52 proceeds to the process of step S22.

Next, when the operation signal is input to the CPU 52 via the track-point controller 59 by operating the retrieval button 126*a* using the track point 5 by the user, the CPU 52 starts retrieval by going back in time as the process of step S22. This makes it possible for the user to add the keyword character string input from the keyboard as a tag for the image file and to record it as file management information on the HDD 56. Therefore, the CPU 52 retrieves the specified keyword character string from among them.

More specifically, when the specification of retrieval by a keyword character string (tag (SIGGRAPH)) is made by the user, in step S23, the CPU 52 reads the image file in which the keyword character string is posted from the HDD 56 and causes the LCD 21 to display it via the LCD controller 83.

As a result, it is possible for the user to confirm the image file in which the tag (SIGGRAPH) is posted. Also, as in step S24, it is possible for the user to find the desired image file by referring to the image files displayed on the screen 111. In a manner as described above, according to this embodiment, it is possible to retrieve a file easily, the contents of which are difficult to understand from the file name, such as an image file.

Next, the weathering function of a tag which is posted onto the screen 111 is described with reference to FIGS. 12 and 13. Here, the weathering function refers to a function in which the color of the tag gradually changes over time.

Figure 12:
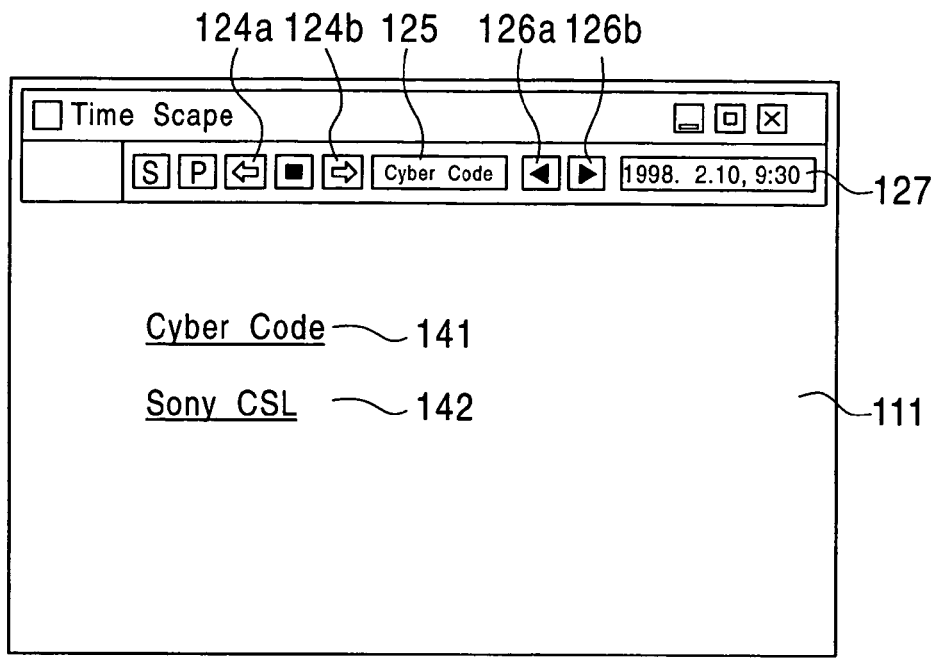
FIG. 12 is a view illustrating the weathering function of the tag posted on the screen 111.
Figure 13:
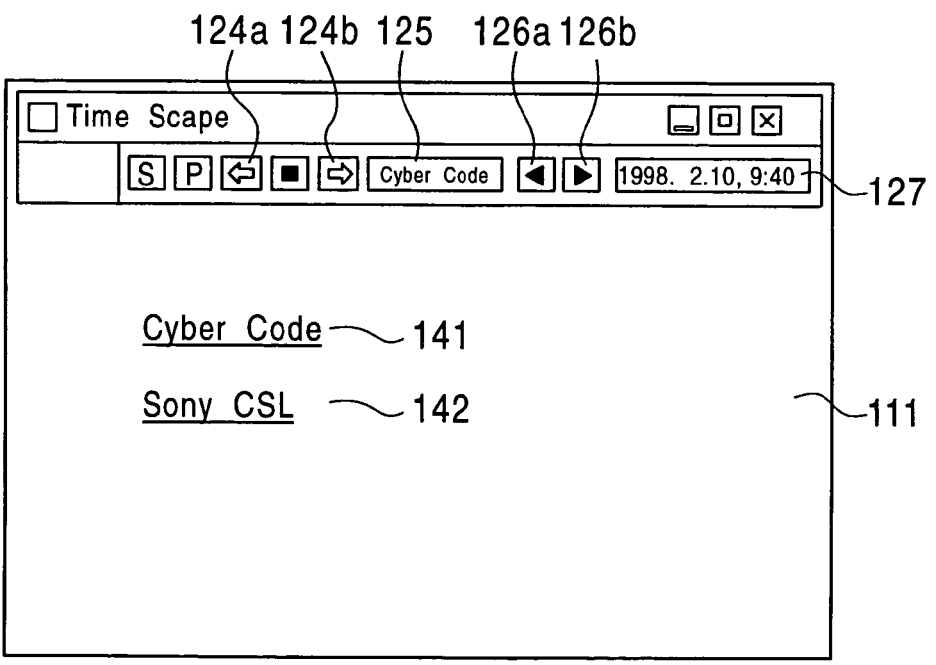
FIG. 13 is a view illustrating the weathering function of the tag posted on the screen 111.

As shown in FIG. 12, for example, a tag (for example, Cyber Code) 141 and a tag (for example, Sony CSL) 142 have a vivid color (for example, yellow) at the time (for example, 9 o'clock, 40 minutes, Feb. 10, 1998) when they are posted onto the screen 111. This color gradually changes over time, and for example, at 10 o'clock, 40 minutes, Feb. 20, 1998, the tag 141 and the tag 142 shown in FIG. 13 are a less-vivid yellow.

As a result, it is possible for the user to intuitively determine whether or not the tag posted onto the screen 111 has just been posted.

Next, referring to FIGS. 14A, 14B, and 14C, a description is given of a case in which the present invention is applied to another OS (for example, UNIX (trademark)) for managing files by a directory structure.

In UNIX, it is assumed that a document file is created as a file name "genkou.txt" in a directory "/user/rekimoto/doc/" in Sep. 1, 1998. This file can usually be accessed as a full path name "/user/rekimoto/doc/genkou.txt".

On the other hand, in the method of the present invention, since the contents of the file are managed according to the file creation time, the above-mentioned file can also be referred to as a path name with time "/1998.9.1/user/rekimoto/doc/genkou.txt" (FIG. 14A). This path name is a special path name for referring to "the contents of the "/user/rekimoto/doc/genkou.txt" at the specified time (Sep. 1, 1998)".

Thereafter, when this document file is changed, the contents of the file at the time it is changed are stored. In the normal path name "/user/rekimoto/doc/genkou.txt", the up-to-date file can always be referred to (similar to the existing file system). On the other hand, in the path name with time, since "the contents of the file at the specified time" can be referred to, the contents of the "genkou.txt" file at, for example, September 10, can be referred to as "/1998.9.10/user/rekimoto/doc/genkou.txt" (FIG. 14B).

The created document file and the change history are stored on the HDD 56. That is, each time a change is made to the file, the change history is stored on the HDD 56, making it possible to reproduce the contents of the file at any time, so that the contents can be referred to by the path name with time.

It is possible to combine the path name with time and a conventional file management command. For example, for changes made by the user from Sep. 1, 1998 to Sep. 10, 1998, a diff command (a command for displaying the difference between two document files), which is widely used in UNIX, can be used, as shown in FIG. 14C. That is, it is possible for the user to confirm the contents of the file at any time and the changes thereto without consciously using a version management command.

As described above, according to the first embodiment of the present invention, since the file is stored in such a manner as to correspond to day and time, and the file is retrieved by moving the time axis as required and is displayed, it is possible to manage (control) files without the user using folders on the desktop screen.

Next, a second embodiment is described below in which an information processing apparatus and method, and a distribution medium of the present invention, are used.

Generally, on the computer system, data stored in, for example, a HDD can be referred to by using various application programs. For example, data of electronic mail can be referred to by using an application program called a mail client, and image data photographed by, for example, a digital camera can be referred to by using an application program called an image browser (image file browser). Most of these application programs have the concept of "time". For example, in the mail client, the received time at which the mail which is currently referred to was received becomes the "time" of the application. In the image browser, the time at which the image was photographed becomes the time of the application. Also, in the application program shown in the first embodiment, the concept of time is introduced into the desktop environment itself so that the state of the desktop (file, tag, photograph, etc.) at any time can be reproduced.

However, in ordinary application programs, such as the mail client, the image browser, etc., one in which information can easily be retrieved by using the concept of time among applications is not present. Therefore, for example, in an operation in which "it is desired to reproduce the state of the desktop at the time a particular piece of electronic mail was received and to access the file of the work which was being performed at that time" or "it is desired to retrieve an image photographed when this text is being written", an operation of several stages extending across a plurality of application programs is required, and this is complex.

Accordingly, in the second embodiment of the present invention, by communicating time information among various application programs (for example, the desktop environment, schedule management software, an image browser, and an application such as a voice memo) which operate on the computer system and other information equipment, linking among the applications is achieved. Thus, for example, retrieval of information in which time is a key, such as "a photographic image photographed around the time at which this electronic mail was received being retrieved", can be realized.

Figure 15:
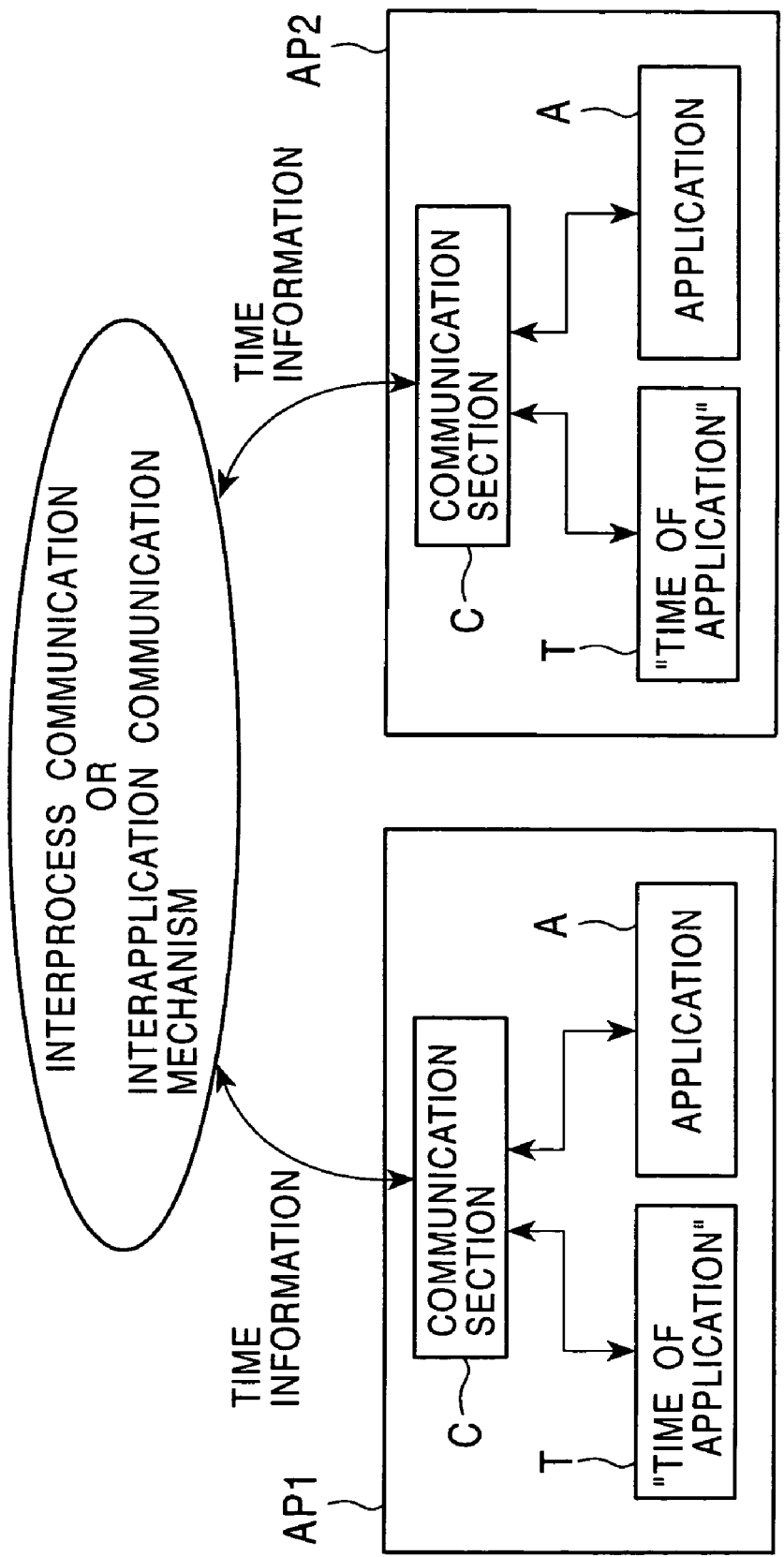
FIG. 15 is a view for use in the explanation of the construction of a second embodiment of the present invention.

In order to realize this, applications AP1 and AP2 in which the second embodiment of the present invention is applied each have the concept of "time of application", for example, as shown in FIG. 15. That is, in addition to an application section A which is the main body of the application program, it has a time processing section T which handles the "time of application", and a communication section C which communicates at least the "time of application" with another application program. For example, in the case of the image browser, the time at which the currently displayed image was photographed (created) becomes the "time of application". Also, for example, in the case of an application which realizes the desktop environment which is capable of moving in time as in the first embodiment, the time of the reproduced desktop becomes the "time of application".

Also, in the second embodiment, when each application receives time information from another application, it is possible to synchronize "time of application" to the time information. For example, in the case of the image browser, when time information is received from another application, the state of the application is changed so as to display the image photographed at the time closest to the received time. Also, for example, in the case of the application which realizes the desktop environment which is capable of moving in time as in the first embodiment, when time information is received from another application, the state of the desktop of the time corresponding to the received time is reproduced on the screen. That is, in the application which realizes the desktop environment which is capable of moving in time in the first embodiment, the file icons and the tags which were placed on the desktop at the time corresponding to the time information received from the other application are reproduced at the same positions.

Here, in the application which realizes the desktop environment which is capable of moving in time in the first embodiment, for example, a file icon reproduced on the desktop in such a manner as to correspond to the time information received from the other application is opened. Then, the state of the file at the time corresponding to the received time is reproduced and is displayed on the screen. In order to reproduce the state of the file at the time corresponding to the time received from another application in a manner as described above, for example, the following two techniques can be used.

In a first technique, for example, each time a change is made to a file, the version information of the file is stored together with the time. That is, in the case of the first technique, when the state of the file at the time corresponding to the time received from another application is reproduced, the file of the version corresponding to the received time is opened.

In a second technique, for example, each time a change is made to a file, the difference between the previous file and the changed file is stored. That is, in the case of this second technique, when the state of the file at the time corresponding to the time received from another application is reproduced, the differences corresponding to the received time are applied in sequence to create the desired file contents.

Furthermore, in the second embodiment of the present invention, each time the "time of application" is changed, each application sends notification thereof to the other application. For example, if it is assumed that the image browser is operated and another image is displayed, the "time" of the image browser at this time becomes the photographed time (created time of the image file) of that image. Accordingly, the time information of the image file is notified to the other application.

For the method of communicating time information among applications, one to one (for example, one to one between the application of the image browser and the application which realizes the desktop environment capable of moving in time) is conceivable. However, more generally, multiple to multiple (that is, "broadcast communication", or "multicasting") is assumed. Multicasting is a method for transmitting information simultaneously to application programs belonging to a particular group. In the second embodiment of the present invention, as a range (group) in which the multicasting is performed, several stages are possible. For example, the following are possible.

Group of "applications operating on the same computer",

Group of "applications started by the same user (for example, schedule software on a PDA, and mail software on a desktop computer)", and Group of "applications belonging to the same organization (for example, a blackboard-type computer for conferences, a notebook computer possessed by a conference participant, and a household-information electrical appliance in a living room of a particular house". As shown by this example, in this embodiment, applications linking in time need not necessarily operate on the same computer. Needless to say, it is possible to control the participation of the multicasting to the group by setting an application and by an operation by the user.

Figure 16:
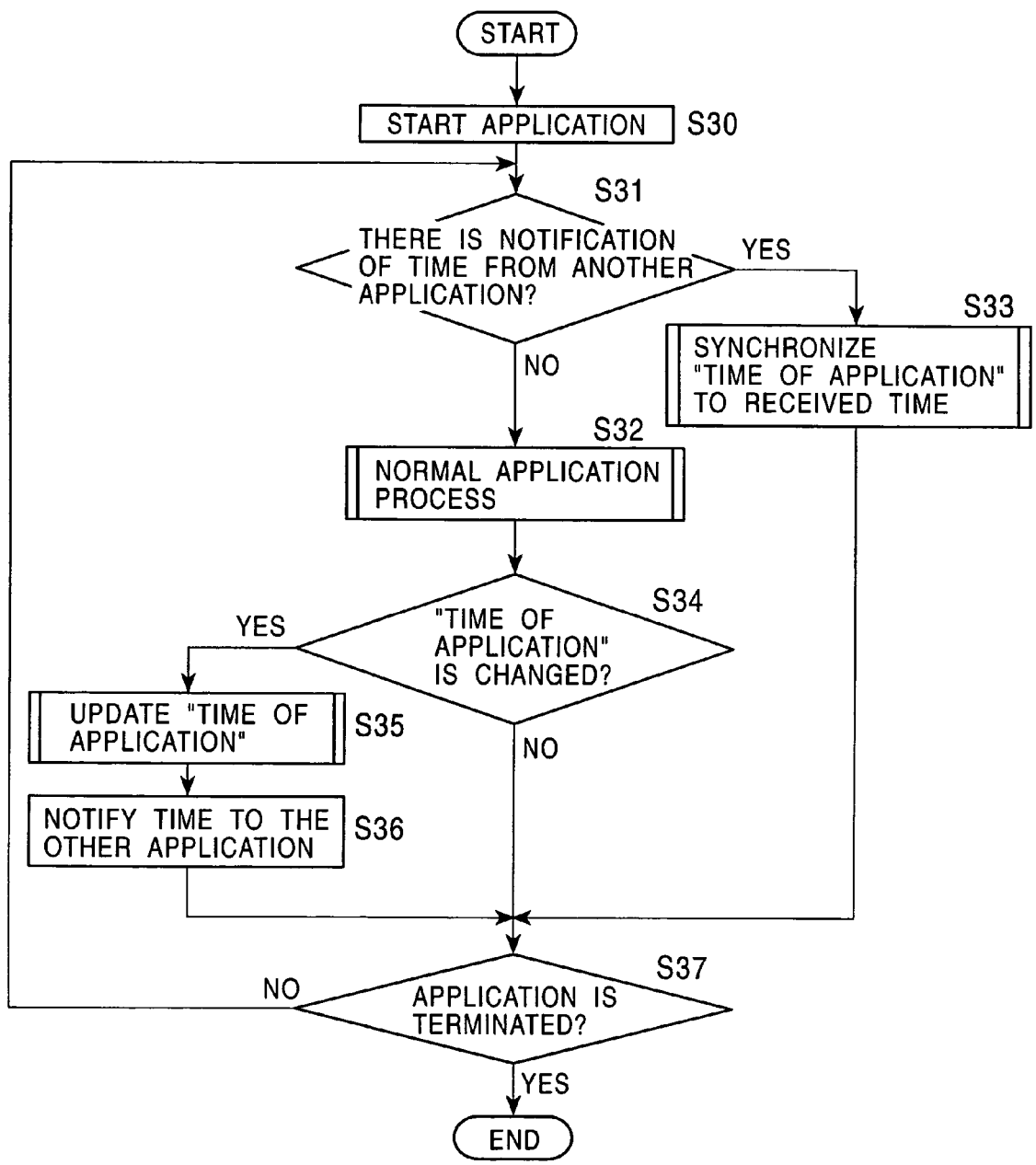
FIG. 16 is a flowchart showing the flow of a linking operation among applications in the second embodiment of the present invention.

FIG. 16 shows the flow of operation of each application.

In FIG. 16, when an application is started in step S30, each application determines whether or not notification of time has been made from the other application in step S31.

When it is determined in the determination of this step S31 that there is notification of time from the other application, each application synchronizes the state of the application ("time of application") to the time at which the time information was received from the other application in step S33.

Also, when it is determined in the determination of step S31 that there is no notification of time from the other application, each application performs a normal application in step S32, and then determines whether or not the "time of application" is changed by some operation in step S34.

When it is determined in the determination of step S34 that the "time of application" is changed, each application updates the "time of application" in step S35, and then notifies in step S36 the other application of the time at which the "time of application" was changed.

After processing in steps S33 and S36 or after it is determined that the "time of application" is not changed in step S34, it is determined in step S37 whether or not each application should be terminated. Only when the application is not terminated, the process returns to step S31.

A description is given below of the specific operation of step S33 of FIG. 16 and the specific operations of steps S32, S33, and S35 of FIG. 16, which provide the meaning of the "time of application" in each application by using several applications as examples. The definition of the "time of application" in each application may differ for each application. Generally, meaning is given such that the user can recall "what operation was being performed at that time, or what the application was doing at that time".

Figure 17:
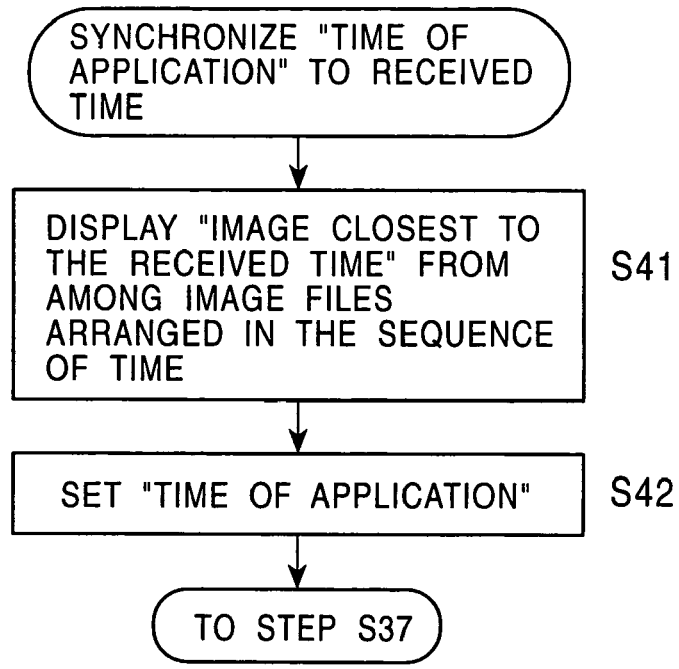
FIG. 17 is a flowchart showing the flow of the operation of step S33 of FIG. 16 in an image browser.
Figure 18:
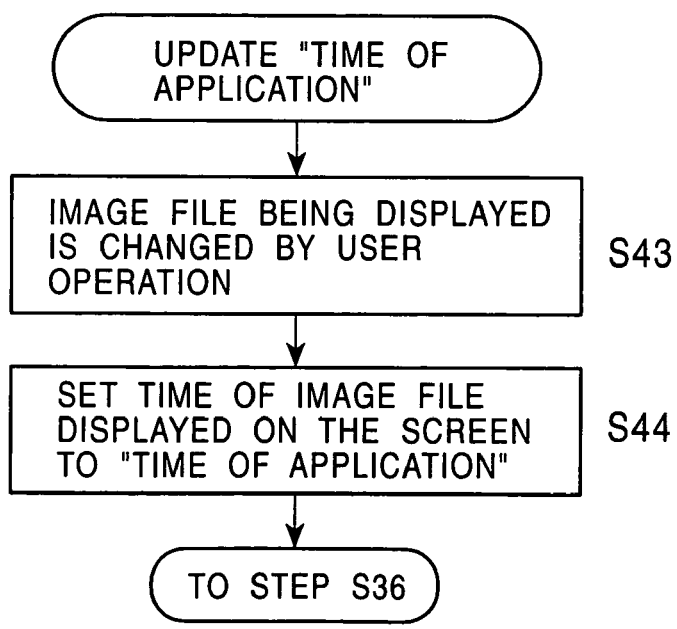
FIG. 18 is a flowchart showing the flow of the operations of steps S32, S33, and S35 of FIG. 16 in the image browser.

FIGS. 17 and 18 show examples of the case where the image browser is used as an application. FIG. 17 shows the flow of the operation of step S33 of FIG. 16 in the image browser. FIG. 18 shows the flow of the operations of steps S32, S34, and S35 of FIG. 16 in the image browser.

When the information of the "time of application" is received from another application in step S33 of FIG. 16, the image browser fetches "an image (file) closest to the received time" from among the image files managed in the sequence of time and displays it on the screen in step S41 of FIG. 17. Next, the image browser sets the "time of application" to the time the information was received from the other application in step S42. Thereafter, the process proceeds to step S37 of FIG. 16.

In the case of the image browser, the "time of application" is changed by the process of FIG. 18 when, for example, the image file displayed on the screen is changed by user operation. That is, for example, when the image file being displayed on the screen is changed by the operation by the user as in step S43 of FIG. 18 while a normal application is being performed in step S32 of FIG. 16, it is determined in step S33 of FIG. 16 that the "time of application" is changed. When it is determined that the "time of application" is changed in this manner, the image browser sets the time of the image file being displayed on the screen to the "time of application" in step S44 (step S35 of FIG. 16). Thereafter, the process proceeds to step S36 of FIG. 16.

Figure 19:
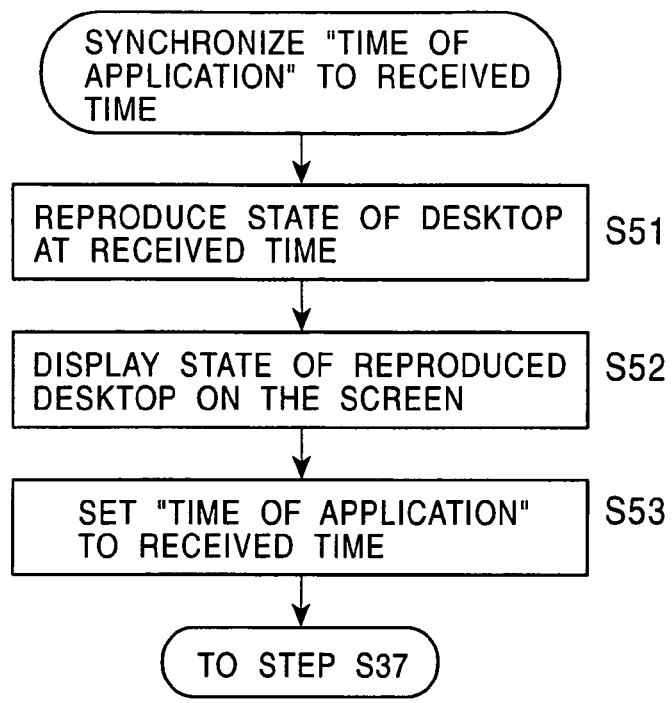
FIG. 19 is a flowchart showing the flow of the operation of step S33 of FIG. 16 in an application which realizes a desktop environment capable of moving in time.
Figure 20:
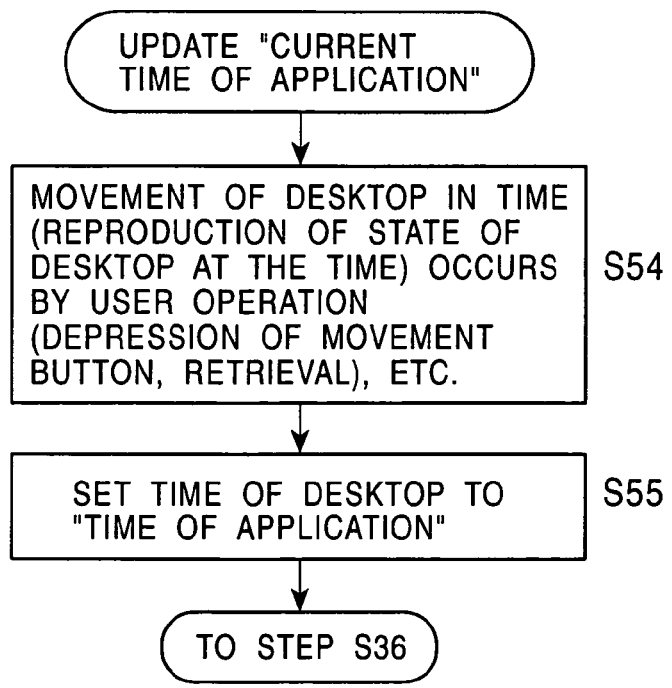
FIG. 20 is a flowchart showing the flow of the operations of steps S32, S33, and S35 of FIG. 16 in the application which realizes a desktop environment capable of moving in time.

FIGS. 19 and 20 show examples of cases where an application which realizes a desktop environment capable of moving in time as in the second embodiment is used as an application. FIG. 19 shows the flow of the operation of step S33 of FIG. 16 in the application which realizes a desktop environment capable of moving in time. FIG. 20 shows the flow of the operations of steps S32, S33, and S35 of FIG. 16 in the application.

When the information of the "time of application" is received from another application in step S33 of FIG. 16, the application which realizes a desktop environment capable of moving in time reproduces the state of the desktop of the time corresponding to the received time in step S51 of FIG. 19. Next, the application displays the state of the reproduced desktop on the screen in step S52. Thereafter, the "time of application" is set to the time at which the information was received from the other application, and the process proceeds to the process of step S37 of FIG. 16.

In the case of the application which realizes a desktop environment capable of moving in time, the "time of application" is changed by the process of FIG. 20 when the time movement (reproduction of the state of the desktop at that time) of the desktop environment occurs as a result of, for example, the user depressing the movement button or instructing the execution of retrieval. That is, for example, when the time movement of the desktop environment occurs as a result of an operation by the user as in step S54 of FIG. 20 while a normal application is being performed in step S32 of FIG. 16, it is determined in step S33 of FIG. 16 that the "time of application" is changed. When it is determined that the "time of application" is changed in this manner, the application sets the time of the desktop to the "time of application" in step S55 (step S35 of FIG. 16). Thereafter, the process proceeds to step S36 of FIG. 16.

Figure 21:
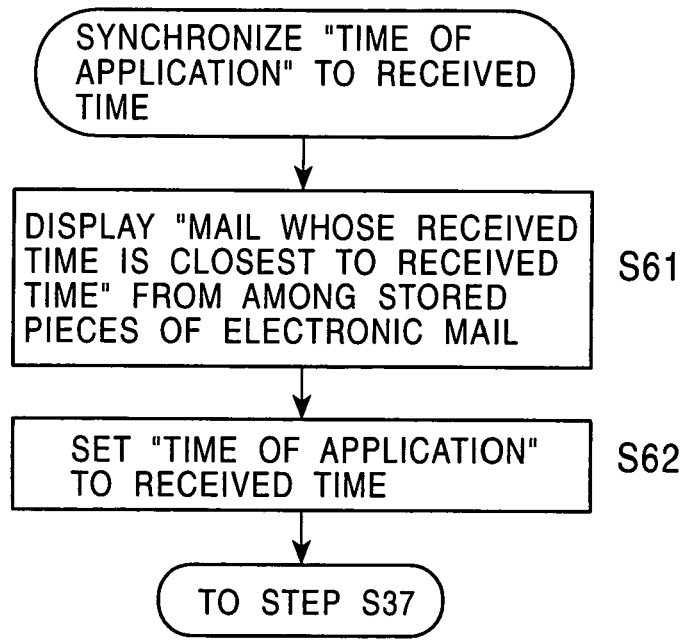
FIG. 21 is a flowchart showing the flow of the operation of step S33 of FIG. 16 in an electronic mail browser.
Figure 22:
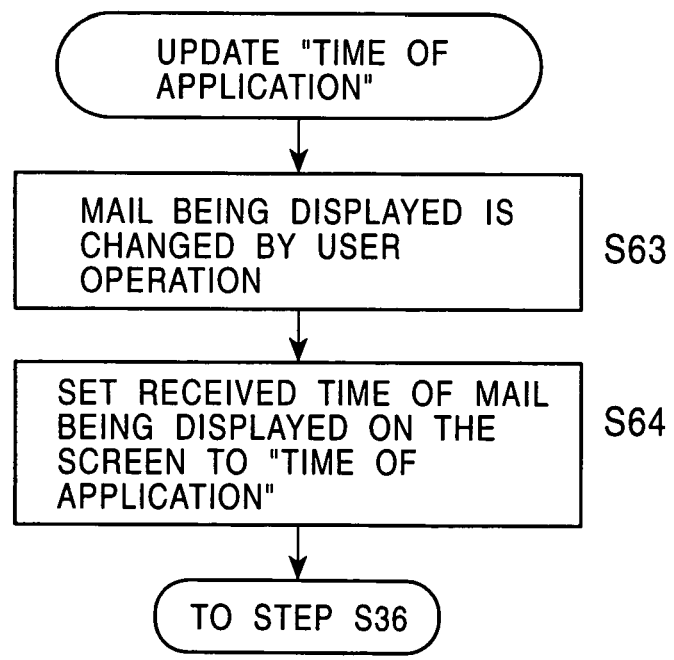
FIG. 22 is a flowchart showing the flow of the operations of steps S32, S33, and S35 of FIG. 16 in the electronic mail browser.

FIGS. 21 and 22 show examples of cases where an electronic mail browser is used as an application. FIG. 21 shows the flow of the operation of step S33 of FIG. 16 in the electronic mail browser. FIG. 22 shows the flow of the operations of steps S32, S33, and S35 of FIG. 16 in the electronic mail browser.

When the information of the "time of application" is received from another application in step S33 of FIG. 16 of FIG. 21, the electronic mail browser fetches the "mail having a reception time closest to the time at which the information was received" from among the stored pieces of electronic mail and causes it to be displayed on the screen. Next, the electronic mail browser sets the "time of application" to the time at which the information was received from the other application in step S62. Thereafter, the process proceeds to step S37 of FIG. 16.

In the case of the electronic mail browser, the "time of application" is changed by the process of FIG. 22 when, for example, the mail being displayed on the screen is changed, for example, by an operation by the user. That is, while a normal application process is being performed, for example, in step S32 of FIG. 16, when the mail being displayed on the screen is changed by the operation by the user as in step S63 of FIG. 22, it is determined in step S33 of FIG. 16 that the "time of application" is changed. When it is determined that the "time of application" is changed in this manner, the electronic mail browser sets the received time of the mail being displayed on the screen to the "time of application" in step S64 (step S35 of FIG. 16). Thereafter, the process proceeds to step S36 of FIG. 16.

Figure 23:
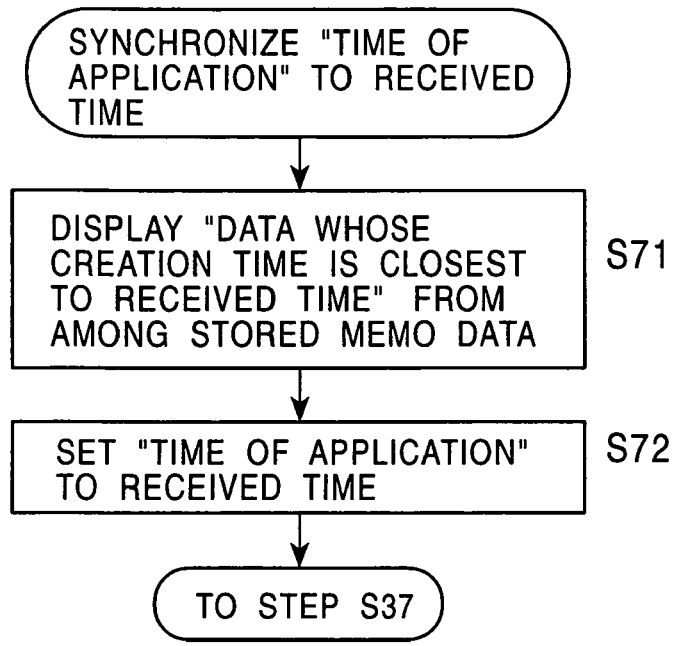
FIG. 23 is a flowchart showing the flow of the operation of step S33 of FIG. 16 in an application of a memo system.
Figure 24:
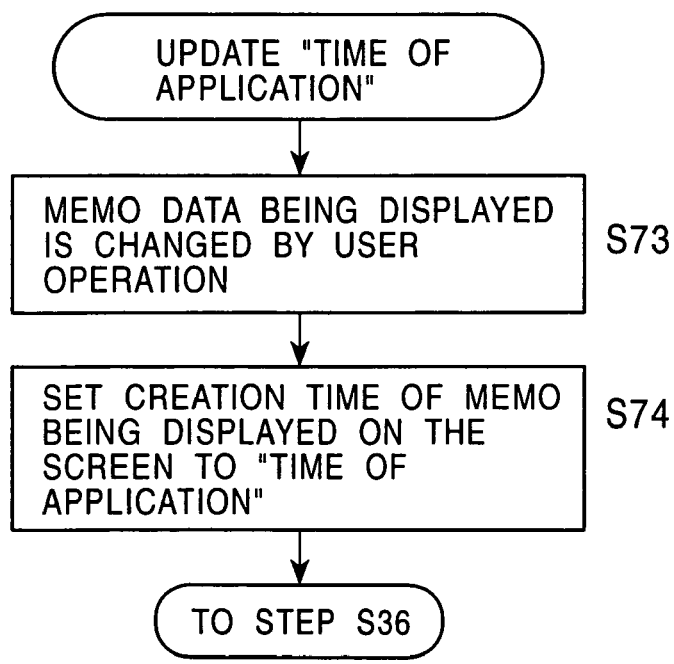
FIG. 24 is a flowchart showing the flow of the operations of steps S32, S33, and S35 of FIG. 16 in the application of the memo system.

FIGS. 23 and 24 show examples of cases where an application which realizes what is commonly called a voice memo, a handwritten memo system, etc., is used as an application.

FIG. 23 shows the flow of the operation of step S33 of FIG. 16 in the application of the memo system. FIG. 24 shows the flow of the operations of steps S32, S33, and S35 of FIG. 16 in the application of the memo system.

When the information of the "time of application" is received from another application in step S33 of FIG. 16, the application of the memo system fetches "data for which the creation time is closest to the time the information was received" from among the stored memo data and causes it to be displayed on the screen in step S71 of FIG. 23. Next, the application of the memo system sets the "time of application" to the time at which the information was received from the other application in step S72. Thereafter, the process proceeds to step S37 of FIG. 16.

In the case of the application of the memo system, the "time of application" is changed by the process of FIG. 24 when the memo data being displayed on the screen is changed, for example, by the operation by the user. That is, for example, while a normal application process is being performed in step S32 of FIG. 16, when the memo data being displayed on the screen is changed by the operation by the user as in step S73 of FIG. 24, it is determined in step S33 of FIG. 16 that the "time of application" is changed. When it is determined that the "time of application" is changed in this manner, the application of the memo system sets the creation time of the memo being displayed on the screen to the "time of application" in step S74 (step S35 of FIG. 16). Thereafter, the process proceeds to step S36 of FIG. 16.

Next, a description is given below of a specific example when linking based on time is performed among applications as in the second embodiment of the present invention.

Figure 25:
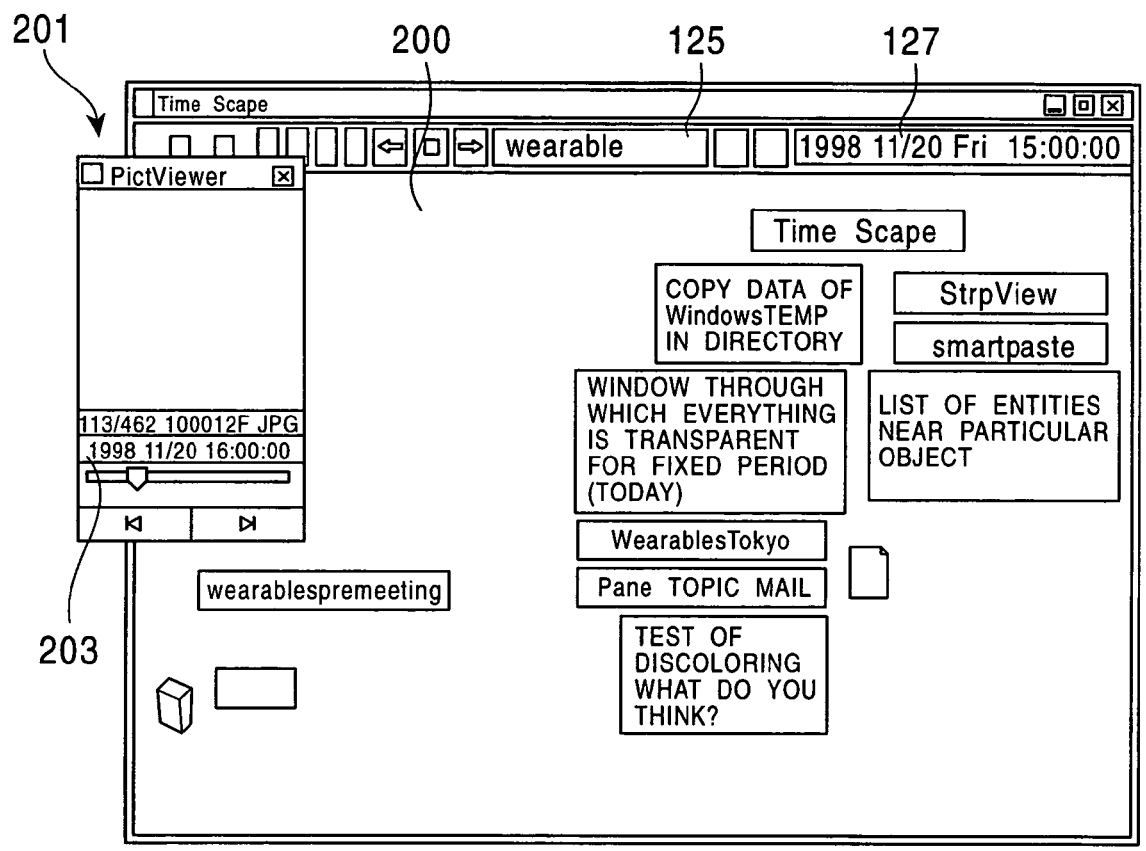
FIG. 25 is a view showing an example of a display screen when linking based on time is performed between an application which realizes a desktop environment capable of moving in time and an application of the image browser.

FIG. 25 shows an example of a display screen in a case in which linking based on time is performed between an application which realizes a desktop environment capable of moving in time as in the first embodiment and an application of an image browser.

It is assumed in FIG. 25 that, for example, retrieval is performed in advance on the desktop by the application which realizes a desktop environment capable of moving in time, and the time is moved up to the time a particular character string and a particular icon appear on the desktop. In this example, it is assumed that, for example, a character string "wearable" is input to the retrieval character input space 125, the character string of "wearable" is retrieved by the application which realizes a desktop environment capable of moving in time, and the icon, the character string, and the like, which were used at the time of the conference related to the character string of this "wearable", are displayed on a window 200. In this example, as can be understood from the display contents of the day-and-time display section 127, the desktop environment for the conference which was held at 15:00 hours, Friday, Nov. 20, 1998, is displayed on the window 200.

When the "time of application" is determined by the application which realizes a desktop environment capable of moving in time in a manner as described above, the time information is notified to the image browser.

The image browser receiving the time information displays the photographic image photographed around the time (in the midprocessing of the conference) on a window 201. In this example, as can be seen from the display contents of an image-file creation-time display section 203, a photographic image photographed at 16:00 hours, Nov. 20, 1998, is displayed on the window 201.

When, in contrast, the image browser is operated, the state of the desktop at the time when the photographic image was photographed is reproduced. Therefore, even if a special caption (explanation) is not provided for the photographic information, it is possible to understand the circumstances in which the photograph was taken.

The example of FIG. 25 was described by using, as an example, the linking between the application of the image browser and the application which realizes a desktop environment capable of moving in time. However, many other examples of an application having time in a manner as described above are conceivable.

For example, when the electronic mail software (electronic mail browser) is linked with the application which realizes a desktop environment capable of moving in time, linking such that "a file related to a work which was being performed around the time a particular piece of mail was received is displayed on the desktop" becomes possible.

In the case where document creation software (commonly called "word processor software") is linked with the application which realizes a desktop environment capable of moving in time, if, for example, the document creation software is capable of attaching time information for each paragraph (or for each character), linking is possible such that "a work which was being performed around the time at which a particular paragraph was being edited is reproduced on the desktop".

Furthermore, if an application used in a portable apparatus, such as a voice memo or a handwriting system (reference: CrossPad (trademark) of IBM Corporation. That is, a portable system in which a tablet is attached below a memo pad made of paper. When a memo is written using a dedicated pen, the same information as that of the memo remaining on the paper is stored in the computer), is, for example, capable of attaching time to the memo, by linking this application to, for example, the image browser, it is possible to relate the memo to a photograph, such as the "photograph taken around the time at which a particular memo was created". In the case of this example, even if a photograph and an explanation memo thereof are photographed/input independently of each other, it is possible to easily link them afterwards.

In addition, even for an apparatus other than a computer, as long as this apparatus has the concept of "time", the present invention can be applied thereto. For example, if it is assumed that the "current time" of a video deck is "the time when the video being currently played back was recorded", while a past news video was being watched by video, it is possible to easily access the digital video image photographed at that time, the file of a work which was being performed at that time, etc. According to this, it is possible to realize higher efficiency of work at a television production studio, a news production studio, etc. Also, at house, use of "while watching a video of an athletic meet, a photograph taken at the athletic meet is displayed in such a manner as to be synchronized" is possible.

Figure 26:
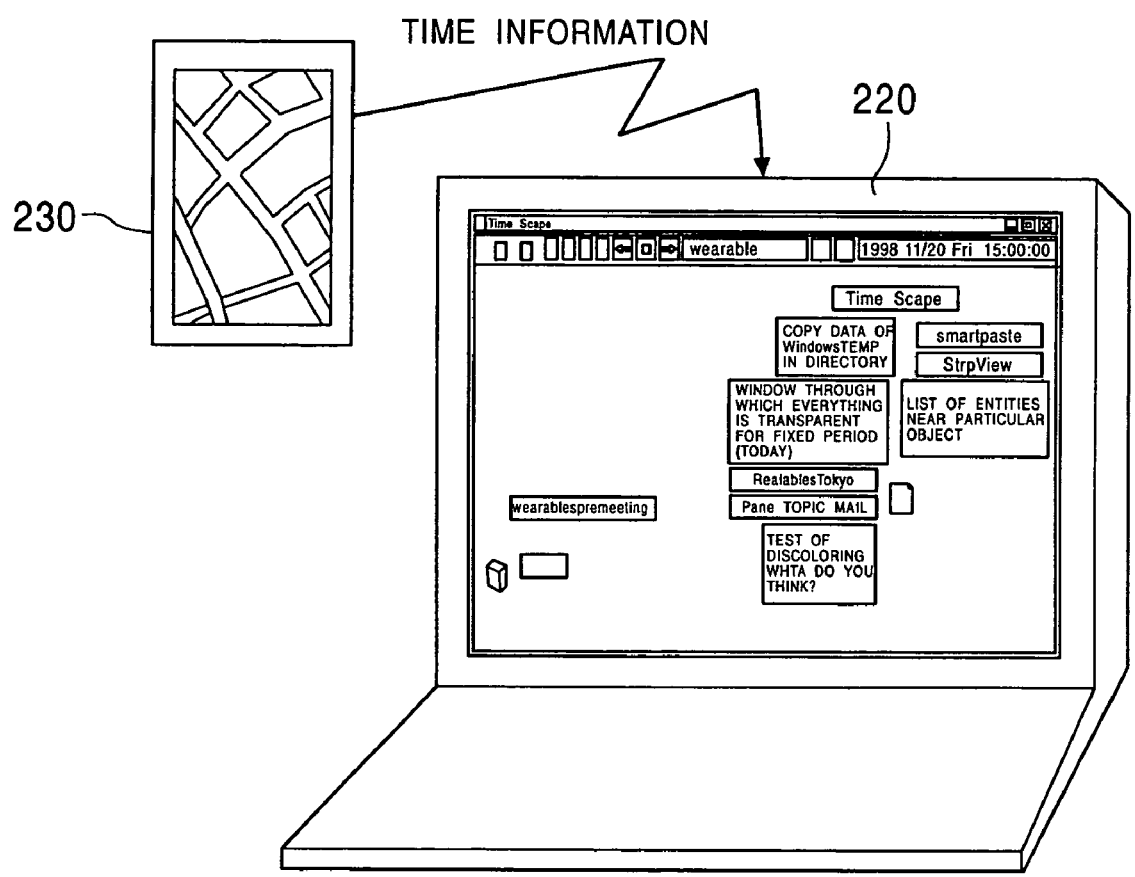
FIG. 26 is a view for use in the explanation of linking between a system (a portable position retrieval apparatus) which is capable of recording positional information by attaching time thereto and a portable apparatus having an application which realizes a desktop environment capable of moving in time.
Figure 27:
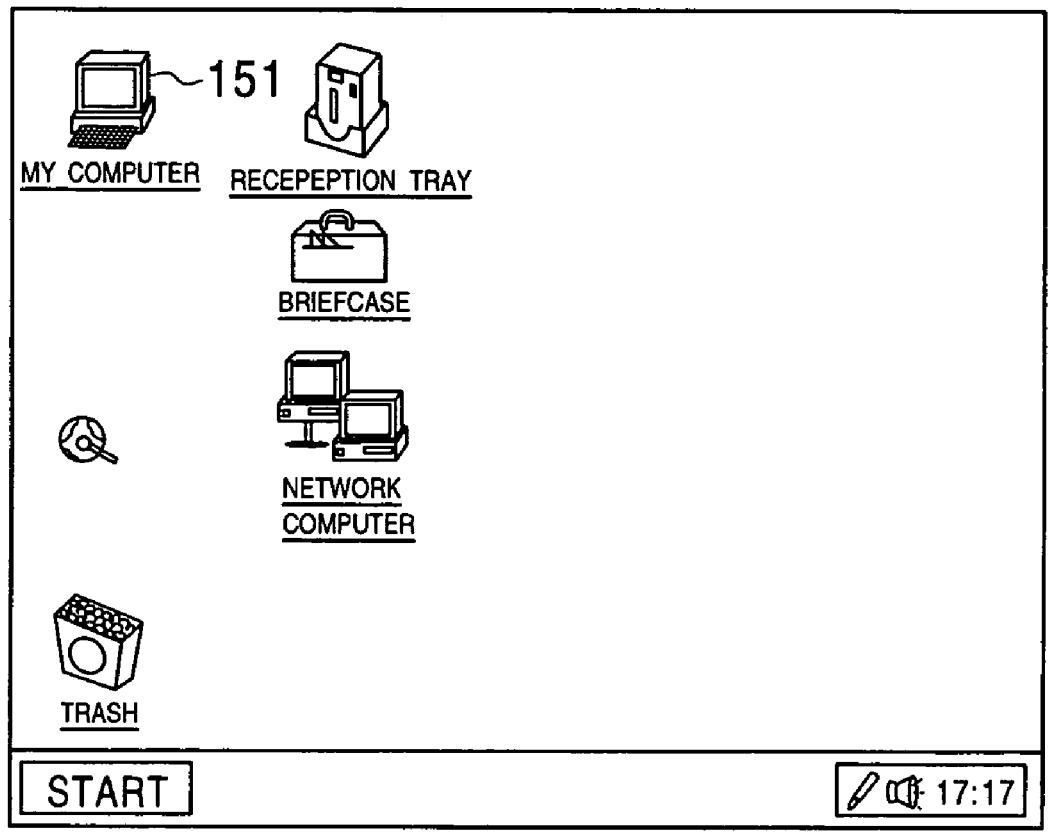
FIG. 27 is a view showing an example of a screen display when an OS is started.
Figure 28:
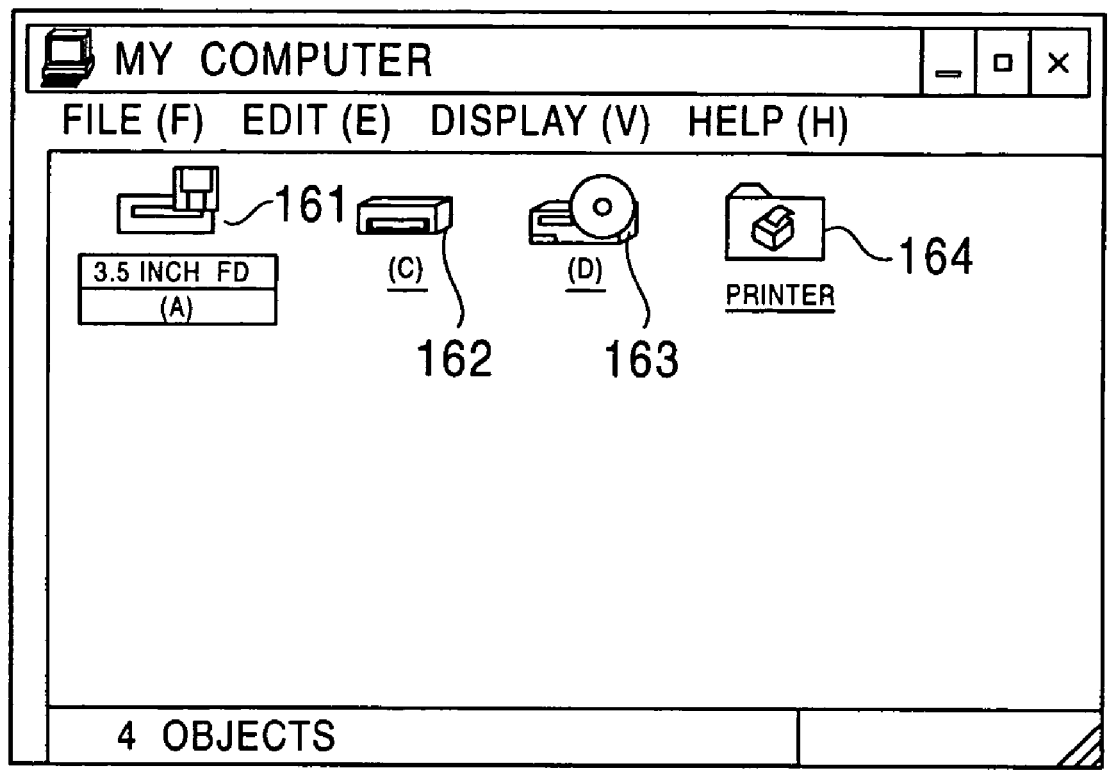
FIG. 28 is a view showing an example of a screen display when an icon 151 of FIG. 27 is clicked.
Figure 29:
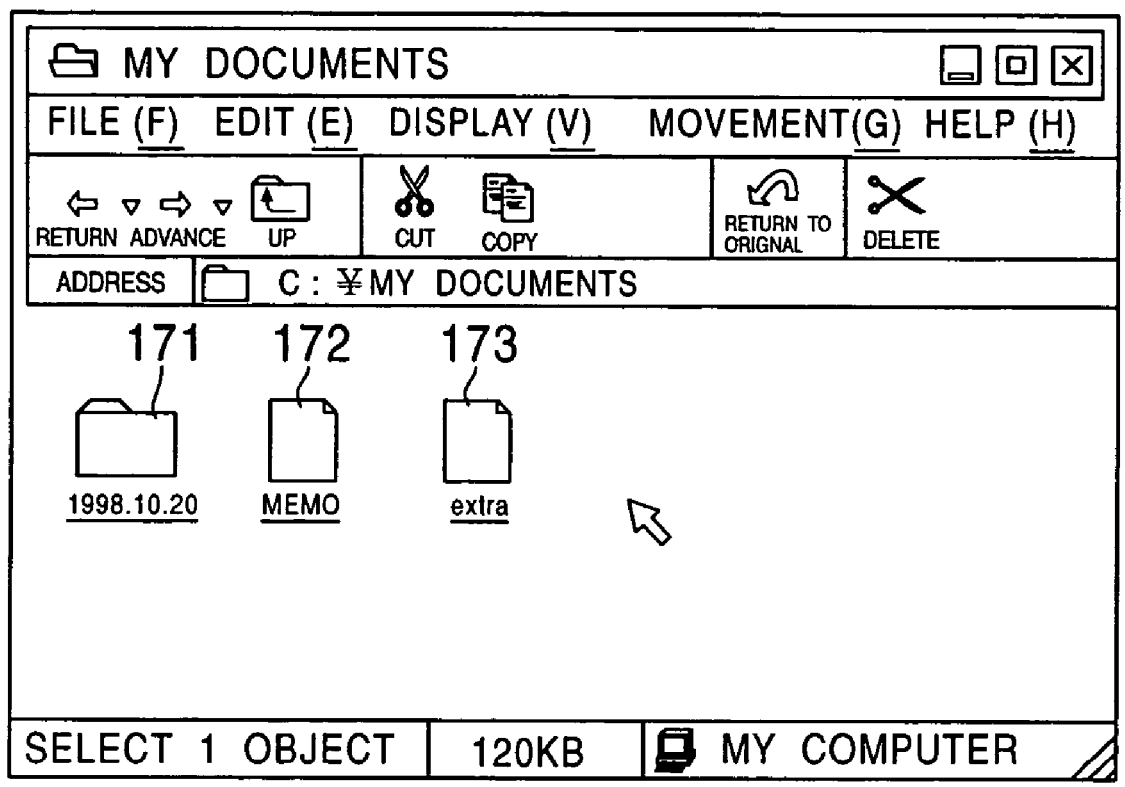
FIG. 29 is a view showing an example of a screen display when a "My Documents" folder in an icon 162 of FIG. 28 is clicked.

Furthermore, for example, as shown in FIG. 26, linking is possible between a system (for example, a portable position retrieval apparatus 230, etc.) which is capable of recording positional information by attaching time thereto, such as GPS (Global Positioning System) or PHS (Personal Handyphone System), and a portable apparatus 220 having the above-mentioned application which realizes a desktop environment capable of moving in time.

In the example of FIG. 26, when the history information of one's position is displayed on the position retrieval apparatus 230 and a specific place is selected, "the time when one was present in that place" is notified to the application of the portable apparatus. Use of this linking makes possible information access using the position and the time as in "a memo file created when you were present in a particular conference room".

As has been described up to this point, according to the second embodiment of the present invention, it is possible to link applications by time information, making it possible to perform flexible information access corresponding to the history of actions of a human being via a plurality of applications.

In each of the first and second embodiments of the present invention, examples of distribution media for providing a computer program which executes the process of each of the above-described embodiments include, in addition to information recording media such as magnetic disks or CD-ROMs, transmission media by a network, such as the Internet or digital satellites.

According to the information processing apparatus and method, and the distribution medium of the present invention, as described above, it is possible to facilitate the management of files, folders, and other data by storing created or changed data in such a manner as to correspond to time information, by setting desired data day and time, and by reproducing the state of the data corresponding to the set day and time on the basis of the time information.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions. It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A computer system comprising: a display; a processor communicatively connected to the display; the processor programmed to generate an object, the object displayed by the display, wherein the object represents data created or modified by a user; and the processor programmed to associate a characteristic with the object, wherein the characteristic includes a first condition representing a first time and a second condition representing a second time; the processor programmed to change the characteristic from the first condition to the second condition, wherein the object continues to be displayed by the display after the characteristic changes from the first condition to the second condition, the change from the first condition to the second condition representing a measured length of time that the object is displayed by the display device, the length of time being measured between an initial time of display and a current system time, wherein the current system time is a time of day and date that the object is being displayed, wherein the first condition includes a first color and the second condition includes a second color, wherein the characteristic includes a color having a level of vividness, and wherein the level of vividness changes based on the length of time the object is displayed by the display device.

2. The computer system of claim 1, wherein the data is stored in at least one of a file and an image, and wherein the object represents the file and/or image.

3. A computer system comprising: a display; a graphical user interface depicted on said display; an object displayed on the graphical user interface, said object including a color having a first condition and a second condition, wherein said object represents data created or modified by a user; and a processor programmed to perform a weathering function applicable to said object, wherein the weathering function changes the color of the object from the first condition to the second condition, wherein the object continues to be displayed by the display after the color changes from the first condition to the second condition, the change from the first condition to the second condition representing a measured length of time that said object is displayed by said display device, the length of time being measured between an initial time of display and a current system time, wherein the current system time is a time of day and date that the object is being displayed, wherein the color includes a level of vividness, and wherein the level of vividness changes over time, wherein the measured length of time between the initial time of display of the object and the current system time is used to determine when the color changes from the first condition to the second condition.

4. The computer system of claim 3, wherein the data is stored in at least one of a file and an image, and wherein the object represents the file and/or image.

5. A graphical user interface controlled by a processor, said graphical user interface comprising:

an object representing information displayed to a user, the object including a first display condition and a second display condition;

wherein the processor is programmed to change the object gradually over time from the first display condition to the second display condition, wherein the object continues to be displayed by the display after the color changes from the first display condition to the second display condition, the change from the first condition to the second condition representing a measured length of time that the object is displayed to the user, the length of time being measured between an initial time of display and a current system time, wherein the current system time is a time of day and date that the object is being displayed, wherein the object includes a color, wherein the processor is operable to change the color of the object gradually over time based on the length of time that the object is displayed to the user, wherein the color includes a level of vividness, and wherein the level of vividness changes over time.

6. The graphical user interface of claim 5, wherein the information is stored in at least one of a file and an image, and wherein the object represents the file and/or image.

7. A computer system comprising:

a processor;

a display controlled by the processor;

a graphical interface depicted on said display; at least two objects created or modified by a user at a designated time, wherein each of the objects includes a color and is displayed by said display at the designated time that each of the objects is created or modified by the user, and wherein the processor causes the color of each of the objects to change over a measured length of time, wherein the objects continue to be displayed by the display after the color of each of the objects changes, the change in color representing a length of time that each of the objects is displayed on said display after said designated time, the length of time being measured between an initial time of display and a current system time, wherein the current system time is a time of day and date that the object is being displayed, wherein the color includes a level of vividness, wherein the level of vividness of the color changes over time, wherein the measured length of time between the initial time of display and the current system time is used to determine when the color of each of the objects changes.

8. A computer system comprising:

a display:

storage means for storing data when said data is created or changed, wherein said stored data includes time information corresponding to a time at which said data is stored; and an object including a color having a first condition and a second condition, the object displayed by said display, said object representing said stored data, wherein the color of the object changes from the first condition to the second condition, wherein the object continues to be displayed by the display after the color changes from the first condition to the second condition, the change in color representing a measured length of time that said object is displayed by said display device, the length of time being measured between an initial time of display and a current system time, wherein the current system time is a time of day and date that the object is being displayed, wherein the color includes a level of vividness, and wherein the level of vividness changes over time, wherein the measured length of time between the initial time of display of the object and the current system time is used to determine when the color changes from the first condition to the second condition.

9. The computer system of claim 8, wherein the data is stored in at least one of a file and an image, and wherein the object represents the file and/or image.

10. A computer system comprising:

a display;

a graphical user interface depicted on said display; an object representing information displayed in said graphical user interface; and a processor programmed to change a characteristic of said object in said graphical user interface from a first condition to a second condition, wherein the object continues to be displayed in said graphical user interface after the characteristic changes from the first condition to the second condition, the change from the first condition to the second condition representing a measured length of time that the object is displayed by the display device and the information is unchanged, the length of time being measured between an initial time of display and a current system time, wherein the current system time is a time of day and date that the object is being displayed, wherein the characteristic includes a color, wherein the color includes a level of vividness, and wherein the processor changes the level of vividness in response to said information being unchanged for greater than a predetermined period of time, wherein the measured length of time between the initial time of display of the object and the current system time is used to determine when the characteristic changes from the first condition to the second condition.

11. The computer system of claim 10, wherein the object is an icon.

12. The computer system of claim 10, wherein the information is stored in at least one file and an image, and wherein the object represents the file and/or image.

* * * * *